United States Patent
Tsugimura

(10) Patent No.: US 8,040,566 B2
(45) Date of Patent: Oct. 18, 2011

(54) IMAGE GENERATING DEVICE, IMAGE GENERATING METHOD AND PRINTING DEVICE

(75) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 412 days.

(21) Appl. No.: 12/412,254

(22) Filed: Mar. 26, 2009

(65) Prior Publication Data

US 2009/0244628 A1     Oct. 1, 2009

(30) Foreign Application Priority Data

Mar. 31, 2008    (JP) .................................. 2008-093315

(51) Int. Cl.
*H04N 1/40*     (2006.01)
(52) U.S. Cl. ........ 358/3.01; 358/1.9; 358/1.18; 358/2.1; 345/441; 345/442; 345/627; 345/628
(58) Field of Classification Search ......................... None
See application file for complete search history.

(56) References Cited

U.S. PATENT DOCUMENTS

| | | | |
|---|---|---|---|
| 5,852,679 | A | 12/1998 | Shimizu |
| 6,201,550 | B1 | 3/2001 | Sakamoto |
| 6,456,298 | B1 | 9/2002 | Kunimasa et al. |
| 6,515,763 | B1 | 2/2003 | Dermer et al. |
| 6,870,954 | B1 | 3/2005 | Gupta |
| 7,009,718 | B2 * | 3/2006 | Fujita ............................ 356/604 |
| 7,268,917 | B2 * | 9/2007 | Watanabe et al. .............. 358/1.9 |
| 2002/0126302 | A1 | 9/2002 | Fukao |
| 2004/0246510 | A1 | 12/2004 | Jacobsen et al. |
| 2007/0268304 | A1 | 11/2007 | Hsu |
| 2009/0244576 | A1 * | 10/2009 | Miyazaki ....................... 358/1.9 |
| 2009/0244630 | A1 * | 10/2009 | Miyazaki ..................... 358/3.01 |

FOREIGN PATENT DOCUMENTS

JP    H11-031231 A    2/1999

OTHER PUBLICATIONS

European Patent Office, European Search Report and Search Opinion for European Patent Application No. 09250933.0 (counterpart to above-captioned patent application), dated Mar. 25, 2011.

* cited by examiner

*Primary Examiner* — Sudhanshu Pathak
*Assistant Examiner* — Miya J Cato
(74) *Attorney, Agent, or Firm* — Baker Botts L.L.P.

(57) ABSTRACT

An image generating method comprises the steps of extracting elliptical shape parameters (specifying an elliptical shape), gradation pattern parameters (specifying a gradation pattern to be drawn in the elliptical shape) and drawing area parameters (specifying a drawing area) from an instruction for drawing an elliptical radial gradation, generating a transformation matrix for transforming the elliptical shape into a perfect circular shape based on the elliptical shape parameters, calculating an inverse matrix of the transformation matrix, transforming the gradation pattern parameters using the transformation matrix, transforming a first area containing the drawing area using the transformation matrix, drawing a radial gradation in the perfect circular shape in a second area containing the transformed first area based on the transformed gradation pattern parameters, and generating the elliptical radial gradation for the drawing area by inversely transforming the second area (in which the radial gradation has been drawn) using the inverse matrix.

15 Claims, 11 Drawing Sheets

```
40 ── <Path Data="M 100,140 L 140,160 L 120,80 Z">
41 ──   <Path.Fill>
30 ──     <RadialGradientBrush
              MappingMode="Absolute"
31 ──        Center="150,150"
32 ──        GradientOrigin="200,170"
33 ──        RadiusX="140"
34 ──        RadiusY="100" >
            <RadialGradientBrush.GradientStops>
35 {          <GradientStop Color="#FFFF00" Offset="0.0" />  ── 35a
              <GradientStop Color="#0000FF" Offset="1.0" />  ── 35b
            </RadialGradientBrush.GradientStops>
          </RadialGradientBrush>
        </Path.Fill>
      </Path>
```

○ RadialGradientBrush ELEMENT

Center="Cx, Cy"             : CENTER COORDINATES OF ELLIPTICAL SHAPE(Cx, Cy)
    GradientOrigin="Gx, Gy"    : CENTER COORDINATES OF GRADATION(Gx, Gy)
    RadiusX="Rx"               : X-RADIUS(RADIUS IN X-AXIS DIRECTION)Rx
    RadiusY="Ry"               : Y-RADIUS(RADIUS IN Y-AXIS DIRECTION)Ry
    GradientStop Color="#RsGsBs" Offset="0"
                                               : COLOR VALUES AT CENTER OF GRADATION Rs, Gs, Bs
    GradientStop Color="#ReGeBe" Offset="1"
                                               : COLOR VALUES AT PERIPHERY OF ELLIPSE Re, Ge, Be ○ Data ATTRIBUTE OF Path ELEMENT M Mx, My                   : MOVE TO COORDINATES(Mx, My)
    L Lx, Ly                  : DRAW LINE SEGMENT TO COORDINATES(Lx, Ly)
    Z                            : CLOSE AREA WITH LINE SEGMENTS

FIG. 2

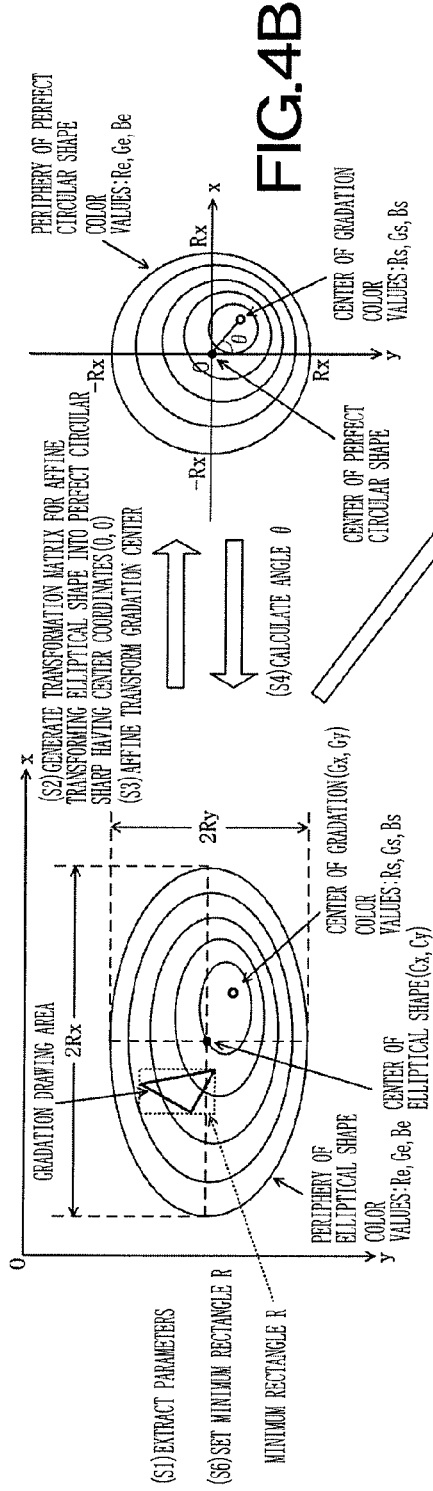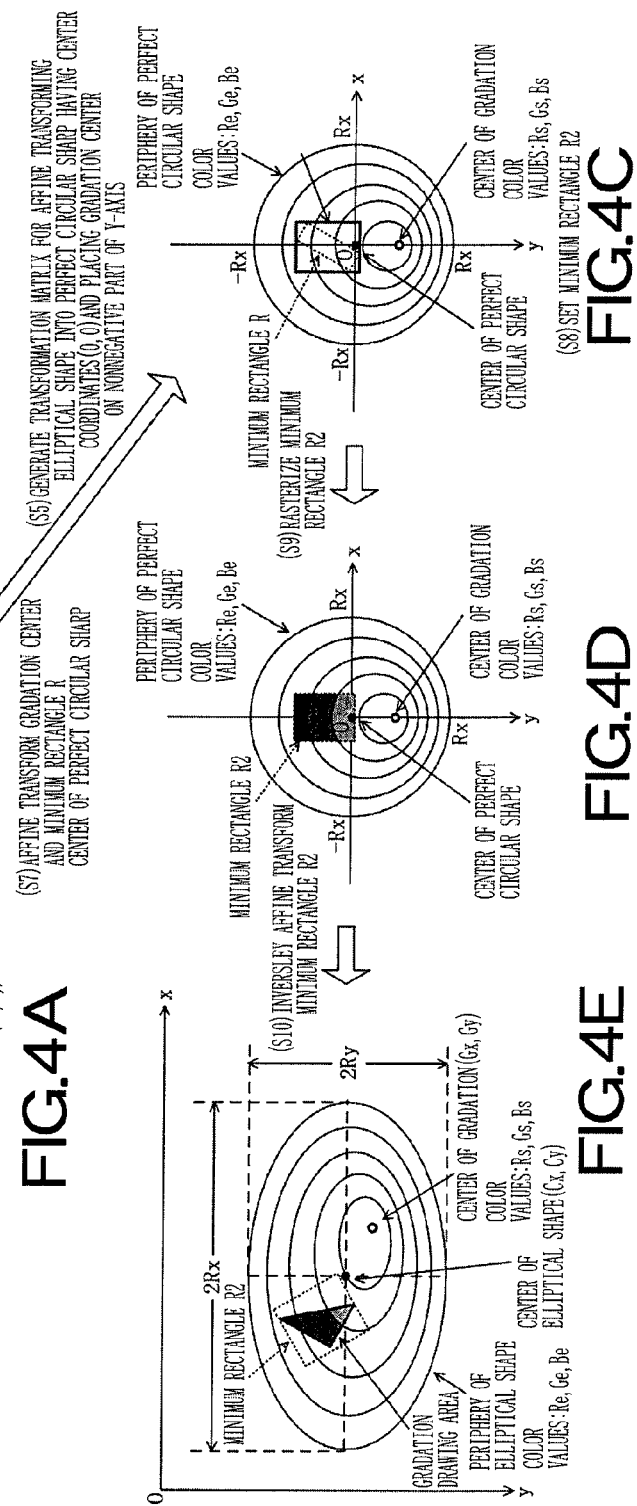

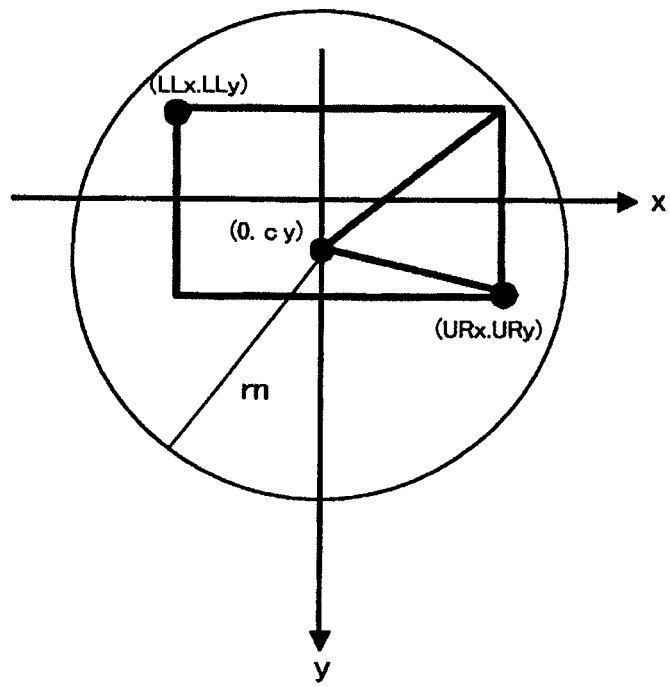

MINIMUM RECTANGLE
　　LOWER RIGHT CORNER R2: (URx, URy)
　　　　UPPER LEFT CORNER: (LLx, LLy)
PERFECT CIRCLE n
　　　　CENTER: (0, Cny)
　　　　RADIUS: rn (1) COMPARE ABSOLUTE VALUE OF X COORDINATE OF LOWER RIGHT CORNER OF MINIMUM RECTANGLE R2 WITH ABSOLUTE VALUE OF X COORDINATE OF UPPER LEFT CORNER OF MINIMUM RECTANGLE R2 AND SET len x AT SQUARE OF THE LARGER $$|LLx| > |URx| \rightarrow \text{len\_x} = LLx \times LLx$$
$$\text{OTHERWISE} \rightarrow \text{len\_x} = URx \times URx$$

(2) JUDGE WHETHER LOWER RIGHT CORNER AND UPPER LEFT CORNER OF MINIMUM RECTANGLE R2 ARE INSIDE PERFECT CIRCLE n $$(LLy - Cny) \times (LLy - Cny) + \text{len\_x} < (rn \times rn)$$
$$(URy - Cny) \times (URy - Cny) + \text{len\_x} < (rn \times rn)$$

IF BOTH INEQUALITIES ARE SATISFIED, MINIMUM RECTANGLE R2 IS CONTAINED IN PERFECT CIRCLE n

FIG. 6

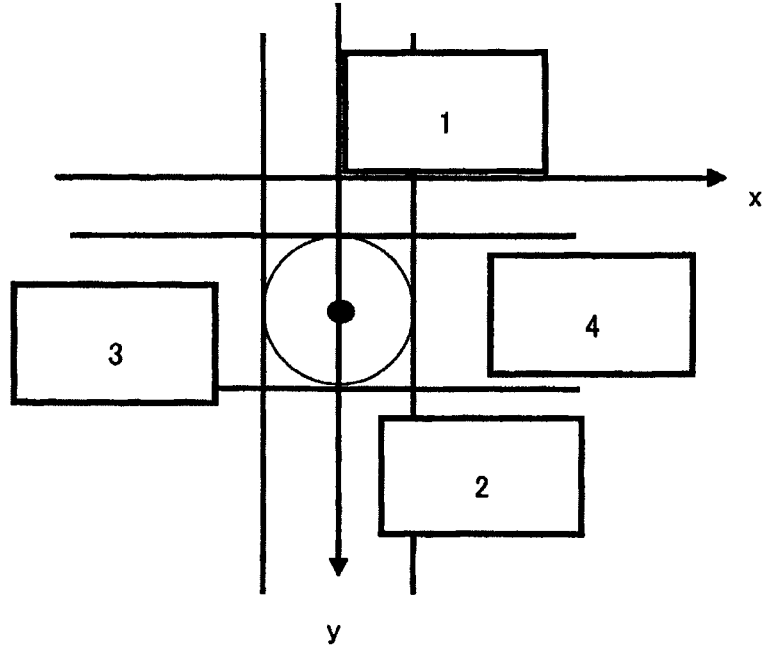

MINIMUM RECTANGLE
  LOWER RIGHT CORNER R2: (URx, URy)
     UPPER LEFT CORNER: (LLx, LLy)

PERFECT CIRCLE n
          CENTER: (0, Cny)
          RADIUS: rn (1) UPPERMOST PART OF PERFECT CIRCLE n IS BELOW LOWERMOST PART OF   : $(Cny - rn) > URy$
    MINIMUM RECTANGLE R2
(2) LOWERMOST PART OF PERFECT CIRCLE n IS ABOVE UPPERMOST PART OF   : $(Cny + rn) < LLy$
    MINIMUM RECTANGLE R2
(3) LEFTMOST PART OF PERFECT CIRCLE n IS TO THE RIGHT OF RIGHTMOST   : $-r > URx$
    PART OF MINIMUM RECTANGLE R2
(4) RIGHTMOST PART OF PERFECT CIRCLE n IS TO THE LIFT OF LEFTMOST   : $r < LLx$
    PART OF MINIMUM RECTANGLE R2

PERFECT CIRCLE n IS JUDGED TO CONTAIN NO PART OF MINIMUM
    RECTANGLE R2 IF ANY OF CONDITIONS (1)-(4) IS SATISFIED

FIG. 7

IMAGE GENERATING DEVICE, IMAGE GENERATING METHOD AND PRINTING DEVICE

CROSS-REFERENCE TO RELATED APPLICATION

This application claims priority under 35 U.S.C. §119 from Japanese Patent Application No. 2008-093315 filed on Mar. 31, 2008. The entire subject matter of the application is incorporated herein by reference.

BACKGROUND

1. Technical Field

The present invention relates to an image generating device, an image generating method and a printing device.

2. Prior Art

With the evolving high performance of document preparation systems and document printing systems using computers in recent years, there are increasing desires of users for realizing complicated expression in drawing. For example, gradation (gradually changing the color in a prescribed drawing area) is being used a lot for effective presentation, for expressing three-dimensional shapes, etc.

In order to print such a gradation (i.e. an image having gradation) with a printer or display such a gradation on a display, it is necessary to generate a gradation pattern in the bitmap format and draw the gradation pattern on a page memory or frame memory. The drawing of the gradation is carried out by successively drawing (overlaying) multiple areas slightly differing in the color value while gradually shifting the drawing position of each area. The drawing of such a gradation requires complicated calculations since each of such areas (to be drawn with the same (uniform) color value) has to be determined and specified for the drawing.

Under such circumstances, various devices have been proposed in order to draw a gradation while reducing the load related to the drawing of the gradation. For example, an image formation device (capable of drawing a concentric circular gradation) described in Japanese Patent Provisional Publication No. HEI 11-31231 (hereinafter referred to as a "patent document # 1") reduces the load for the gradation drawing by carrying out the gradation drawing by first determining color changing points (at each of which the color value changes) for each scan line and then drawing each line segment between two color changing points (on a scan line) with a uniform color value.

SUMMARY OF THE INVENTION

Meanwhile, the XML Paper Specification (hereinafter referred to simply as "XPS") has recently been established as a PDL (Page Description Language) for describing electronic documents, and a lot of products supporting XPS are being put on the market. In XPS, a RadialGradientBrush element can be described in a document as an image drawing instruction for drawing an elliptical radial gradation, by which more complicated gradational expression is made possible.

However, even though the method of drawing a concentric circular gradation is elaborated on in the patent document #1, the document (hereinafter, also referred to as target data) includes no description about a technique for drawing an elliptical radial gradation. If the color changing points (around which different color values are used for the drawing) are calculated based on the locus of an elliptical shape in the process of drawing an elliptical radial gradation, extremely complicated calculations become necessary since the equation expressing the locus of the elliptical shape is already complicated, by which the load on the device (drawing the gradation) related to the drawing of the elliptical radial gradation becomes extremely heavy.

The present invention, which has been made in consideration of the above problems, is advantageous in that an image generating device, an image generating method and a printing device capable of generating an elliptical radial gradation while reducing the load related to the drawing of the gradation can be provided.

In accordance with an aspect of the present invention, there is provided an image generating device comprising a target data accepting unit that accepts target data including an image drawing instruction for drawing an elliptical radial gradation, an acquisition unit that acquires the image drawing instruction from the accepted target data, an extraction unit that extracts elliptical shape parameters specifying an elliptical shape, gradation pattern parameters specifying a gradation pattern to be drawn in the elliptical shape, and drawing area parameters specifying a drawing area in which the elliptical radial gradation is drawn, from the acquired image drawing instruction, a transformation matrix generating unit that generates a transformation matrix for transforming the elliptical shape into a perfect circular shape based on the elliptical shape parameters, an inverse matrix calculating unit that calculates an inverse matrix of the transformation matrix, a first transformation unit that transforms the gradation pattern parameters using the transformation matrix, a second transformation unit that transforms a first area (containing the drawing area specified by the drawing area parameters extracted by the extraction unit) using the transformation matrix, a drawing unit that draws, in a second area, a radial gradation for the perfect circular shape obtained by the transformation with the transformation matrix, based on the transformed gradation pattern parameters transformed by the first transformation unit, wherein the second area contains the transformed first area transformed by the second transformation unit, and a gradation generating unit that generates the elliptical radial gradation in the drawing area by inversely transforming the second area (in which the radial gradation in the perfect circular shape has been drawn by the drawing unit) using the inverse matrix With the image generating device configured as above, when an instruction for drawing an elliptical radial gradation is inputted as the image drawing instruction, a transformation matrix for transforming the elliptical shape into a perfect circular shape is generated by the transformation matrix generating unit. Using the transformation matrix, the gradation pattern parameters (specifying the gradation pattern to be drawn in the elliptical shape) are transformed by the first transformation unit while the first area (containing the drawing area for which the elliptical radial gradation is drawn) is transformed by the second transformation unit. In the second area (containing the transformed first area), a radial gradation in the perfect circular shape obtained by the transformation by the transformation matrix (perfect circular radial gradation) is drawn by the drawing unit based on the gradation pattern parameters after being transformed by the first transformation unit.

As above, upon input of an instruction for drawing an elliptical radial gradation, the drawing of the perfect circular radial gradation is executed first (without directly drawing the elliptical radial gradation), by which color changing points (around which different colors are drawn) can be calculated based on the locus of a perfect circle. Since the calculation can be simplified compared to the case where the elliptical radial gradation is drawn directly, the load related to the drawing of the gradation can be reduced considerably.

Further, since the drawing of the perfect circular radial gradation is executed for the second area (containing the transformed first area), the perfect circular radial gradation can be drawn at least for an area corresponding to the drawing area. By setting the second area to contain the whole of the area corresponding to the drawing area and to be smaller than the whole area (size) of the perfect circular shape, the area for which the perfect circular radial gradation is drawn can be made small and the load related to the drawing of the gradation can be reduced further.

Meanwhile, the inverse matrix of the transformation matrix generated by the transformation matrix generating unit is calculated by the inverse matrix calculating unit, and the elliptical radial gradation is generated for the drawing area by the gradation generating unit by inversely transforming the second area (in which the perfect circular radial gradation has been drawn by the drawing unit) using the inverse matrix. With this configuration, the elliptical radial gradation specified by the parameters included in the image drawing instruction can be generated with ease for the drawing area (for which the elliptical radial gradation should be drawn) specified by the image drawing instruction. Thus, an image generating device capable of generating an elliptical radial gradation while reducing the load related to the drawing of the gradation can be obtained.

According to further aspects of the invention, there is provided a printing device employing an image generating device as described above.

According to other aspects of the invention, there is provided an image generating method which includes a target data accepting step of accepting target data including an image drawing instruction for drawing an elliptical radial gradation, an acquisition step of acquiring the image drawing instruction from the accepted target data, an extraction step of extracting elliptical shape parameters specifying an elliptical shape, gradation pattern parameters specifying a gradation pattern to be drawn in the elliptical shape, and drawing area parameters specifying a drawing area in which the elliptical radial gradation is drawn, from the acquired image drawing instruction, a transformation matrix generating step of generating a transformation matrix for transforming the elliptical shape into a perfect circular shape based on the elliptical shape parameters, an inverse matrix calculating step of calculating an inverse matrix of the transformation matrix, a first transformation step of transforming the gradation pattern parameters using the transformation matrix, a second transformation step of transforming a first area containing the drawing area specified by the drawing area parameters, using the transformation matrix, a drawing step of drawing, in a second area, a radial gradation for the perfect circular shape obtained by the transformation with the transformation matrix, based on the transformed gradation pattern parameters transformed by the first transformation step, wherein the second area contains the transformed first area transformed by the second transformation step, and a gradation generating step of generating the elliptical radial gradation in the drawing area by inversely transforming the second area, in which the radial gradation for the perfect circular shape has been drawn by the drawing step, using the inverse matrix.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 2 is a schematic diagram for explaining examples of a RadialGradientBrush element and a Path element and parameters specified by the elements.

FIGS. 4A-4E are schematic diagrams for explaining principles for drawing an elliptical radial gradation employed in the embodiment.

FIG. 6 is a schematic diagram for explaining a method of determining perfect circles necessary for the drawing of a minimum rectangle R2.

FIG. 7 is a schematic diagram for explaining the method of determining the perfect circles necessary for the drawing of the minimum rectangle R2.

DETAILED DESCRIPTION OF THE EMBODIMENTS

Figure 1:
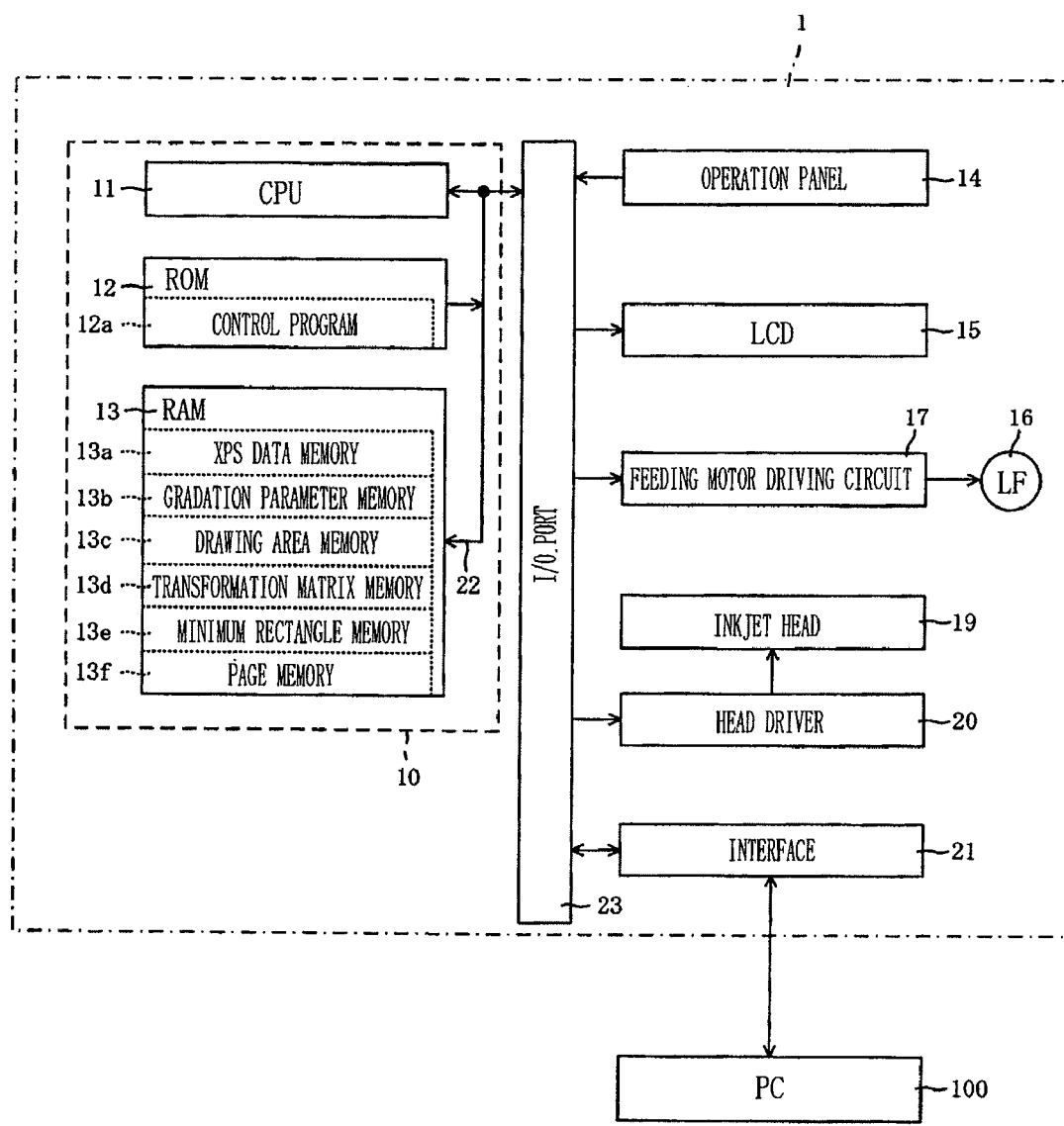
FIG. 1 is a block diagram showing the electrical configuration of a printer (including a printer control unit) in accordance with an embodiment of the present invention.

Referring now to the drawings, a description will be given in detail of a preferred embodiment in accordance with the present invention. FIG. 1 is a block diagram showing the electrical configuration of a printer 1 (including a printer control unit 10) in accordance with an embodiment of the present invention.

The printer 1 (inkjet printer equipped with an inkjet head 19) is a peripheral device for executing printing by discharging ink drops from nozzles of the inkjet head 19 toward a sheet (e.g. paper). The printer control unit 10 is a unit for controlling the overall operation of the printer 1 while generating image data to be printed by the printer 1.

The printer 1 is connected to a PC (Personal Computer) 100 via a communication cable or wireless communication. When a print command transmitted from the PC 100 is received, data (e.g. electronic document described according to XPS (hereinafter referred to as an "XPS document")) transmitted from the PC 100 together with the print command is analyzed and image data according to the data (e.g. XPS document) is generated by the printer control unit 10, and then an image according to the generated image data is printed on a sheet by the inkjet head 19.

In this case, if a RadialGradientBrush element 30 (see FIG. 2) as an image drawing instruction ordering the drawing of an elliptical radial gradation is included in the XPS document, an elliptical radial gradation specified by the RadialGradientBrush element 30 is generated in an area specified by the XPS document by the printer control unit 10 of the printer 1.

The printer control unit 10 is configured to be capable of generating the elliptical radial gradation while reducing the load related to the drawing of the elliptical radial gradation. Incidentally, the "elliptical radial gradation" means a gradation (i.e. an image having gradation) in an elliptical shape in which the color value changes radially (with multiple elliptical areas in each of which a uniform color value is used for the drawing) from the center of the gradation to the periphery of the elliptical shape.

Next, the detailed configuration of the printer 1 of this embodiment will be described below. As shown in FIG. 1, the printer 1 is equipped with an operation panel 14, an LCD (Liquid Crystal Display) 15, a feeding motor (LF motor) 16, a feeding motor driving circuit 17, the inkjet head 19, a head driver 20 and an interface 21, as well as the printer control unit 10.

Among the components, the operation panel 14, the LCD 15, the feeding motor driving circuit 17, the head driver 20 and the interface 21 are connected to the printer control unit 10 via an I/O port 23. The feeding motor 16 is connected to the feeding motor driving circuit 17. The inkjet head 19 is connected to the head driver 20.

The printer control unit 10 includes a CPU (Central Processing Unit) 11, a ROM (Read Only Memory) 12 and a RAM (Random Access Memory) 13, which are connected together by a bus line 22. The bus line 22 is connected to the I/O port 23, via which signals are communicated between the printer control unit 10 and each component connected to the I/O port 23.

The CPU 11 is a processor for controlling the printer 1 and generating image data to be printed by the printer 1 according to programs and fixed values (data) stored in the ROM 12 and the RAM 13, various signals received from the PC 100 via the interface 21, etc.

The ROM 12 is a non-rewritable nonvolatile memory storing a control program 12a to be executed by the CPU 11, fixed values to be referred to by the control program 12a, etc. Programs necessary for executing processes shown in FIGS. 8-13 are included in the control program 12a.

Among the programs, a program for a printing process (FIG. 8) is run by the CPU 11 when a print command is received from the PC 100 via the interface 21, by which data received from the PC 100 together with the print command (e.g. XPS document) is analyzed and an image (image data) according to the data is generated.

A program for an elliptical radial gradation rasterization process (FIG. 9) is run by the CPU 11 as a subroutine of the program for the printing process (FIG. 8) in cases where an XPS document is received from the PC 100 following a print command and the received XPS document includes a RadialGradientBrush element 30 (see FIG. 2) as an instruction for drawing an elliptical radial gradation.

Figure 12:
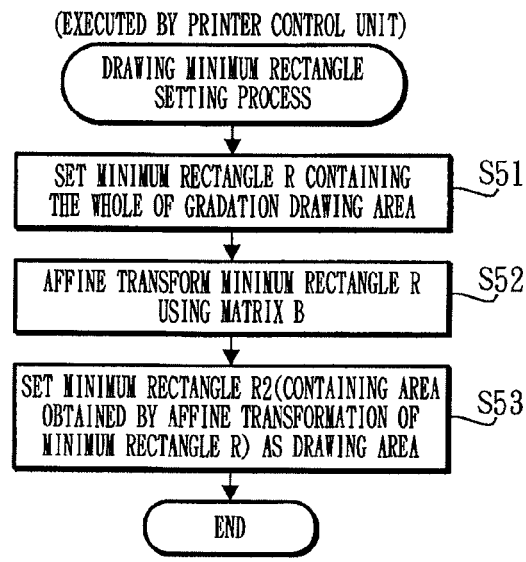
FIG. 12 is a flow chart of a drawing minimum rectangle setting process which is executed by the printer control unit.
Figure 13:
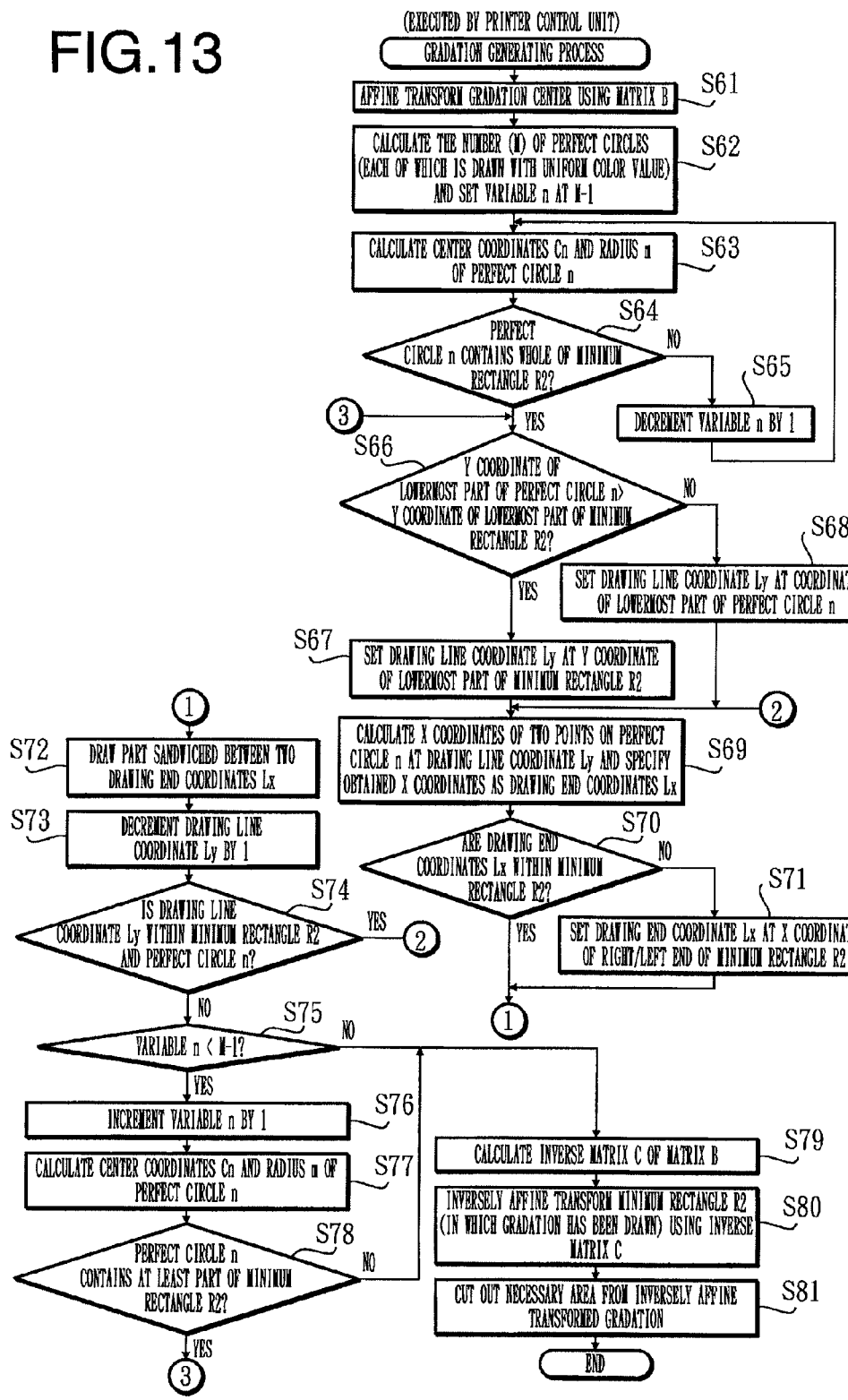
FIG. 13 is a flow chart of a gradation generating process which is executed by the printer control unit.

By running the program for the elliptical radial gradation rasterization process, the CPU 11 successively executes programs for a parameter acquisition process (FIG. 10), a transformation matrix calculation process (FIG. 11), a drawing minimum rectangle setting process (FIG. 12) and a gradation generating process (FIG. 13).

By executing the programs, the CPU 11 generates a transformation matrix for affine transformation of an elliptical shape specified by the RadialGradientBrush element 30 into a perfect circular shape (with its center placed on the origin) and then affine transforms a minimum rectangle R (see FIG. 4A), which includes a gradation drawing area (see FIGS. 2 and 3) specified by an upper level element (e.g. Path element 40) of the RadialGradientBrush element 30, by use of the generated transformation matrix. Subsequently, the CPU 11 draws a perfect circular radial gradation (radial gradation in the perfect circular shape obtained by the affine transformation of the elliptical shape) for a minimum rectangle R2 (see FIG. 4C) which is defined as a minimum rectangular area containing the whole of the minimum rectangle R after the affine transformation and having a side parallel to scan lines. Incidentally, the "perfect circular radial gradation" means a gradation (i.e. an image having gradation) in a perfect circular shape in which the color value changes radially (with multiple perfect circular areas in each of which a uniform color value is used for the drawing) from the center of the gradation to the periphery of the perfect circular shape.

Thereafter, the CPU 11 calculates the inverse matrix of the generated transformation matrix and inversely affine transforms the minimum rectangle R2 (in which the gradation has been drawn) using the inverse matrix, by which (part of) the elliptical radial gradation specified by the RadialGradientBrush element 30 is generated in the gradation drawing area specified by the upper level element (e.g. Path element 40). The details of the principles for the drawing of the elliptical radial gradation employed in this embodiment will be explained later with reference to FIGS. 4A-4E.

The RAM 13 is a rewritable volatile memory for temporarily storing various data. Storage areas such as an XPS data memory 13a, a gradation parameter memory 13b, a drawing area memory 13c, a transformation matrix memory 13d, a minimum rectangle memory 13e and a page memory 13f are reserved in the RAM 13.

The XPS data memory 13a is memory (storage area) for temporarily storing the XPS document received from the PC 100 together with the print command. Upon reception of an XPS document from the PC 100, the interface 21 transfers the received XPS document to the XPS data memory 13a of the RAM 13 by means of DMA (Direct Memory Access), by which the XPS document received from the PC 100 is stored in the XPS data memory 13a.

The XPS document stored in the XPS data memory 13a is read out and the contents of the XPS document are analyzed by the CPU 11 when the printing process (see FIG. 8, explained later) is executed. The CPU 11 generates image data to be printed by the printer 1 by executing an image drawing process according to the contents of the XPS document, and stores the generated image data in the page memory 13f.

The gradation parameter memory 13b is memory for storing elliptical shape parameters (specifying an elliptical shape) and gradation pattern parameters (specifying a gradation pattern to be drawn in the elliptical shape) included in the RadialGradientBrush element 30 (see FIG. 2) which is contained in the XPS document as an image drawing instruction ordering the drawing of an elliptical radial gradation.

Figure 9:
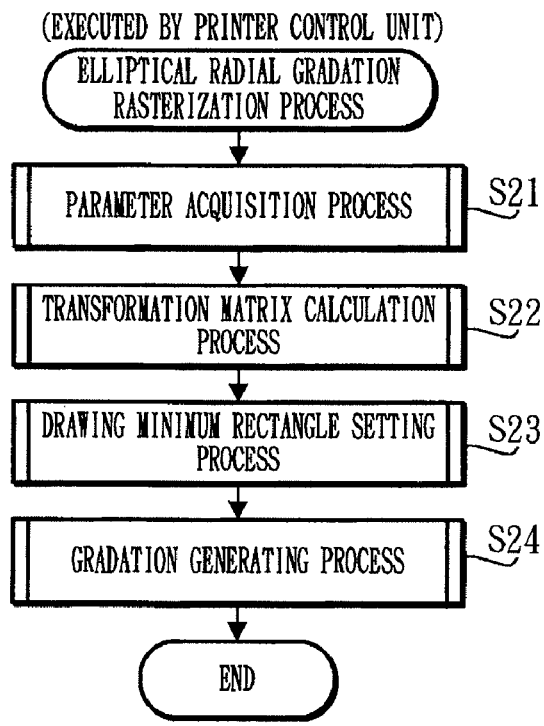
FIG. 9 is a flow chart of an elliptical radial gradation rasterization process which is executed by the printer control unit.

When a RadialGradientBrush element 30 is included in the XPS document stored in the XPS data memory 13a, the CPU 11 extracts the elliptical shape parameters (specifying an elliptical shape) and the gradation pattern parameters (specifying a gradation pattern to be drawn in the elliptical shape) from the RadialGradientBrush element 30 and stores the extracted parameters in the gradation parameter memory 13b in the parameter acquisition process (FIG. 10) which is executed in the elliptical radial gradation rasterization process (FIG. 9). The details of the RadialGradientBrush element 30 included in an XPS document and the parameters included in the element will be explained later with reference to FIGS. 2 and 3.

Among the parameters stored in the gradation parameter memory 13b, the elliptical shape parameters (specifying an elliptical shape) are used for generating the transformation matrix for the affine transformation of the elliptical shape into the perfect circular shape (with its center placed on the origin) in the transformation matrix calculation process (FIG. 11) which is executed by the CPU 11 in the elliptical radial gradation rasterization process (FIG. 9).

Among the parameters stored in the gradation parameter memory 13b, gradation center coordinates (see FIG. 3) included in the gradation pattern parameters (specifying a gradation pattern to be drawn in the elliptical shape) are affine transformed by use of the above transformation matrix in the gradation generating process (FIG. 13) which is executed by the CPU 11 in the elliptical radial gradation rasterization process (FIG. 9).

Based on the gradation pattern parameters stored in the gradation parameter memory 13b (including the gradation center coordinates after undergoing the affine transformation), the perfect circular radial gradation is drawn for the minimum rectangle R2 shown in FIG. 4C.

The drawing area memory 13c is memory for storing parameters specifying the gradation drawing area (in which the elliptical radial gradation is drawn) which are included in the upper level element (e.g. Path element 40) of the RadialGradientBrush element 30 in the XPS document. The details of the Path element 40 included in an XPS document will be explained later with reference to FIGS. 2 and 3.

In the parameter acquisition process (FIG. 10) which is executed in the elliptical radial gradation rasterization process (FIG. 9), the CPU 11 extracts parameters specifying the gradation drawing area (in which the elliptical radial gradation is drawn) from the upper level element (e.g. Path element 40) and stores gradation drawing area parameters (e.g. vector information) determined by the parameters in the drawing area memory 13c.

In the drawing minimum rectangle setting process (FIG. 12) which is executed in the elliptical radial gradation rasterization process (FIG. 9), the CPU 11 refers to the drawing area memory 13c and sets the minimum rectangle R (see FIG. 4A) which is defined as the minimum rectangular area containing the whole of the gradation drawing area whose parameters have been extracted from the upper level element (e.g. Path element 40).

In the gradation generating process (FIG. 13) which is executed in the elliptical radial gradation rasterization process (FIG. 9), the CPU 11 refers to the drawing area memory 13c and cuts out the gradation drawing area from an area obtained by inversely affine transforming the minimum rectangle R2 (in which the perfect circular radial gradation has been drawn) based on the parameters stored in the drawing area memory 13c.

In an XPS document, the gradation drawing area can also be specified by elements other than the Path element 40 (Glyphs element, Canvas element, etc.). In this embodiment, when such an element specifying the gradation drawing area exists in the XPS document, the CPU 11 determines the gradation drawing area based on the element and stores parameters specifying the gradation drawing area in the drawing area memory 13c.

The transformation matrix memory 13d is memory for storing the transformation matrix for the affine transformation from the elliptical shape (specified by the RadialGradientBrush element 30 in the XPS document) into the perfect circular shape. In the transformation matrix calculation process (FIG. 11) executed in the elliptical radial gradation rasterization process (FIG. 9) which will be explained later, the CPU 11 generates the transformation matrix for the affine transformation from the elliptical shape into the perfect circular shape (with its center placed on the origin) based on the elliptical shape parameters stored in the gradation parameter memory 13b and then stores the generated transformation matrix in the transformation matrix memory 13d.

The transformation matrix stored in the transformation matrix memory 13d is used for the affine transformation of the gradation center coordinates (see FIGS. 2 and 3) included in the gradation pattern parameters stored in the gradation parameter memory 13b.

In this case, if the gradation center coordinates after the affine transformation are not on a nonnegative part of the Y-axis, the CPU 11 generates a new transformation matrix by adding a rotational element to the original transformation matrix so that the gradation center coordinates after the affine transformation will be placed on the nonnegative part of the Y-axis. The newly generated transformation matrix is stored in the transformation matrix memory 13d by overwriting the original transformation matrix. The rotational element (which is added to the original transformation matrix) will be explained later with reference to FIGS. 4A-4E.

The gradation center coordinates stored in the gradation parameter memory 13b are affine transformed again by use of the transformation matrix finally stored in the transformation matrix memory 13d (i.e. the transformation matrix to which the rotational element has been added). The aforementioned minimum rectangle R is also affine transformed using the transformation matrix finally stored in the transformation matrix memory 13d.

For the minimum rectangle R2 (see FIG. 4C) as the minimum rectangular area containing the area obtained by the affine transformation of the minimum rectangle R, the CPU 11 draws the perfect circular radial gradation (radial gradation in the perfect circular shape obtained by the affine transformation).

For the transformation matrix finally stored in the transformation matrix memory 13d (i.e. the transformation matrix to which the rotational element has been added), an inverse matrix is calculated by the CPU 11. The CPU 11 inversely affine transforms the minimum rectangle R2 (in which the perfect circular radial gradation has been drawn) using the calculated inverse matrix, by which (part of) the elliptical radial gradation specified by the RadialGradientBrush element 30, generated for the drawing area specified by the upper level element, can be obtained.

The minimum rectangle memory 13e is memory for storing coordinates of the minimum rectangle R2 (see FIG. 4C) in which the perfect circular radial gradation (radial gradation in the perfect circular shape obtained by the affine transformation of the elliptical shape by the transformation matrix stored in the transformation matrix memory 13d) is drawn.

In the drawing minimum rectangle setting process (FIG. 12) executed in the elliptical radial gradation rasterization process (FIG. 9), the CPU 11 sets the minimum rectangle R (see FIG. 4A) containing the whole of the drawing area (in which the elliptical radial gradation is drawn) based on the parameters specifying the drawing area stored in the drawing area memory 13c, executes the affine transformation to the minimum rectangle R, sets the minimum rectangle R2 containing the whole of the area obtained by the affine transformation of the minimum rectangle R, and stores the coordinates of the minimum rectangle R2 in the minimum rectangle memory 13e.

In the gradation generating process (FIG. 13) executed in the elliptical radial gradation rasterization process (FIG. 9), the CPU 11 determines perfect circles necessary for the drawing of the minimum rectangle R2 (among all perfect circles (each of which should be drawn with a uniform color value) formed in the perfect circular radial gradation) from the coordinates of the minimum rectangle R2 stored in the minimum rectangle memory 13e, and draws the perfect circular radial gradation for the minimum rectangle R2 based on the coordinates of the minimum rectangle R2 stored in the minimum rectangle memory 13e. The method of determining the perfect circles necessary for the drawing of the minimum rectangle R2 will be explained later with reference to FIGS. 6 and 7.

The page memory 13f is memory for storing the image data to be printed by the printer 1 (generated by the printer control unit 10) in the bitmap format. The elliptical radial gradation generated by the elliptical radial gradation rasterization process (FIG. 9) and other image data generated according to the data (e.g. XPS document) are rasterized on the page memory 13f.

When the image data to be printed by the printer 1 has been rasterized on the page memory 13f by the printing process (FIG. 8) according to the data received from the PC 100 together with the print command, the CPU 11 drives the feeding motor driving circuit 17 and the head driver 20 and thereby prints an image corresponding to the image data stored in (rasterized on) the page memory 13f on a sheet (e.g. paper).

The operation panel 14 is a user interface including input buttons for letting the user make printer settings, input instructions, etc. The LCD 15 is a display device for displaying a variety of information (menu, operating status of the printer 1, etc.) depending to the user operation on the operation panel 14.

The feeding motor (LF motor) 16 is a stepping motor for feeding a sheet (placed at a prescribed position in/on the printer 1) downstream or upstream in the feeding direction. Driving control of the feeding motor 16 is executed by the feeding motor driving circuit 17 according to instructions from the CPU 11. By the driving of the feeding motor 16, the sheet is fed to the lower surface of the inkjet head 19 (to face the tips of the nozzles).

The inkjet head 19, as a print head having multiple nozzles (unshown) and actuators (unshown), is equipped with four inkjet head units corresponding to four color inks (cyan, magenta, yellow, black). The head driver 20 is a driving circuit for driving the actuators of the inkjet head 19.

The CPU 11 generates multivalued data corresponding to the four color inks (cyan, magenta, yellow, black) based on the image data stored in the page memory 13f and sends the generated multivalued data to the head driver 20 via a gate array (unshown). The head driver 20 generates driving pulses corresponding to the multivalued data supplied from the CPU 11 and applies the driving pulses to the actuators corresponding to the nozzles, by which ink drops are selectively discharged from the nozzles and an image corresponding to the image data stored in the page memory 13f is printed on a sheet.

The interface 21 is a unit for controlling data communication between the printer 1 and the PC 100. The printer 1 receives the print command and the data specifying the image to be printed (e.g. XPS document) from the PC 100 via the interface 21.

Upon reception of a print command from the PC 100, the interface 21 sends an interrupt signal (for reporting the reception of the print command) to the CPU 11. Upon reception of an XPS document from the PC 100, the interface 21 transfers the received XPS document to the XPS data memory 13a in the RAM 13 by means of DMA (Direct Memory Access).

Figure 3:
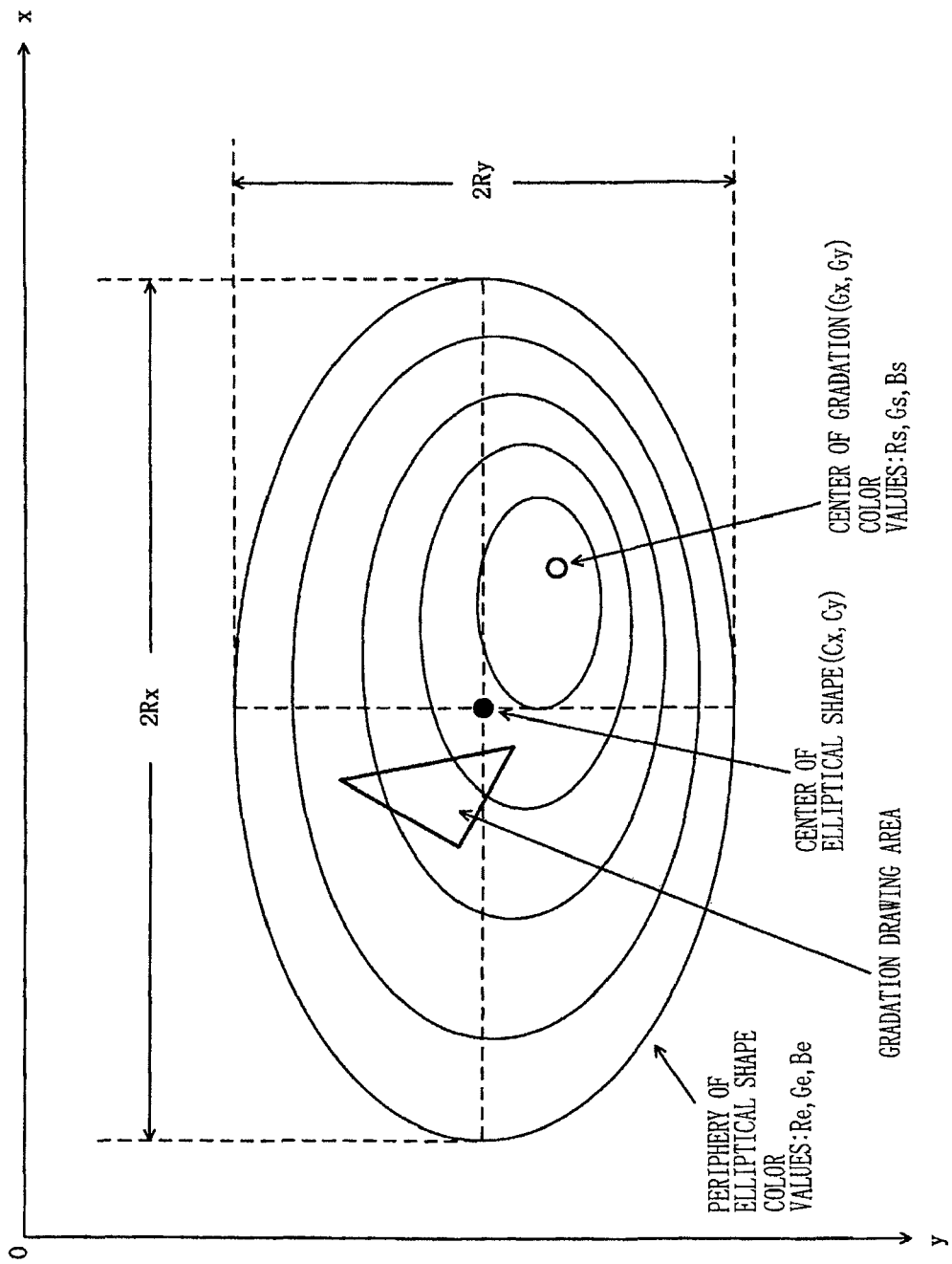
FIG. 3 is a schematic diagram showing an example of an elliptical radial gradation which is drawn according to the parameters specified by the RadialGradientBrush element and the Path element.

In the following, the details of the RadialGradientBrush element (included in an XPS document) and the Path element 40 (as an upper level element of the RadialGradientBrush element 30) will be explained referring to FIGS. 2 and 3. FIG. 2 is a schematic diagram for explaining examples of the RadialGradientBrush element 30 and the Path element 40 and parameters specified by the elements. FIG. 3 is a schematic diagram showing an example of an elliptical radial gradation which is drawn according to the parameters specified by the RadialGradientBrush element 30 and the Path element 40.

First, the RadialGradientBrush element 30 is made up of a plurality of attributes and sub-elements as shown in FIG. 2. Among the attributes and sub-elements, a "Center" attribute 31, a "RadiusX" attribute 33 and a "RadiusY" attribute 34 give the elliptical shape parameters (specifying an elliptical shape). Meanwhile, a "GradientOrigin" attribute 32 and a RadialradientBrush.GradientStops element 35 give the gradation pattern parameters (specifying a gradation pattern to be drawn in the elliptical shape).

The "Center" attribute 31 specifies the coordinates (Cx, Cy) of the center of the elliptical shape shown in FIG. 3. Here, the "center of the elliptical shape" means a point where the major axis and the minor axis of the elliptical shape intersect with each other.

The "GradientOrigin" attribute 32 specifies the coordinates (Gx, Gy) of the center of the gradation shown in FIG. 3 (i.e. the gradation center coordinates). Here, the "center of the gradation" means a point where the color variation in the radial gradation starts (i.e. starting point of the gradation).

The radial gradation is expressed so that its color gradually changes from its center to points on the periphery of the elliptical shape specified by the RadialGradientBrush element 30 (as endpoints of the color variation in the gradation (endpoints of the gradation)).

Incidentally, the parameters given by the "Center" attribute 31 and the "GradientOrigin" attribute 32 are described in terms of an orthogonal coordinate system represented by two coordinate axes (X-axis, Y-axis) intersecting with each other at right angles at an origin defined at the upper left corner of a printing area specified by the XPS document (see FIG. 3).

In this orthogonal coordinate system, the (positive) X-axis extends in the horizontal direction of the printing area (from left to right), while the (positive)Y-axis extends in the vertical direction of the printing area (from top to bottom).

In the example of the RadialGradientBrush element 30 shown in FIG. 2, the center coordinates of the elliptical shape are specified as (150, 150) by the "Center" attribute 31, while the center coordinates of the gradation is specified as (200, 170) by the "GradientOrigin" attribute 32.

Meanwhile, the "RadiusX" attribute 33 specifies the radius Rx of the elliptical shape in the X-axis direction (hereinafter referred to as an "X-radius"), and the "RadiusY" attribute 34 specifies the radius Ry of the elliptical shape in the Y-axis direction (hereinafter referred to as a "Y-radius").

Incidentally, the major/minor axes of the elliptical shape (specified by the parameters of the "RadiusX" attribute 33 and the "RadiusY" attribute 34) are set in the X-axis direction and Y-axis direction.

Therefore, the smaller of Rx or Ry represents the minor axis radius of the elliptical shape, while the larger of Rx or Ry represents the major axis radius of the elliptical shape. As shown in FIG. 3, the lengths of the elliptical shape in the X-axis direction and Y-axis direction are 2Rx and 2Ry, respectively.

In the example of the RadialGradientBrush element 30 shown in FIG. 2, the X-radius is specified as "140" by the "RadiusX" attribute 33, and the Y-radius is specified as "100" by the "RadiusY" attribute 34.

Meanwhile, the RadialGradientBrush.GradientStops element 35 gives parameters specifying color values of the gradation. The element 35 includes two sub-elements: GradientStop elements 35a and 35b. Each GradientStop element (35a, 35b) includes a "Color" attribute and an "Offset" attribute.

The "Color" attribute specifies color values of red, green and blue at the point specified by the "Offset" attribute. In the "Color" attribute, the color values are described as a six-digit hexadecimal number, in which the most significant two digits specify the red color value, the next two digits specify the green color value, and the least significant two digits specify the blue color value.

The "Offset" attribute specifies the point having the color values specified by the "Color" attribute. For example, when the value of the "Offset" attribute is "0", it means that the color values specified by the "Color" attribute are those at the center (starting point) of the gradation. When the value of the "Offset" attribute is "1", it means that the color values specified by the "Color" attribute are those at the points on the periphery of the elliptical shape specified by the RadialGradientBrush element 30 (i.e. at the endpoints of the gradation).

Therefore, the color values (Rs, Gs, Bs) of red, green and blue at the center (starting point) of the gradation (see FIG. 3) are specified by the GradientStop element 35a, while the color values (Re, Ge, Be) of red, green and blue at the points on the periphery of the elliptical shape (i.e. at the endpoints of the gradation) (see FIG. 3) are specified by the GradientStop element 35b.

In the example of the RadialGradientBrush element 30 shown in FIG. 2, the red/green/blue color values (Rs, Gs, Bs) at the center (starting point) of the gradation are specified as $(FF)_{16}$, $(FF)_{16}$ and $(00)_{16}$ by the GradientStop element 35a.

Meanwhile, the red/green/blue color values (Re, Ge, Be) at the points on the periphery of the elliptical shape (i.e. at the endpoints of the gradation) are specified as $(00)_{16}$, $(00)_{16}$ and $(FF)_{16}$ by the GradientStop element 35b. Incidentally, the value "$(FF)_{16}$" represents "FF" in the hexadecimal notation ("255" in the decimal notation) and the value "$(00)_{16}$" represents "00" in the hexadecimal notation ("0" in the decimal notation).

With the RadialGradientBrush element 30 including such attributes and sub-elements, the drawing position of the elliptical shape in the printing area is determined from (specified by) the center coordinates (Cx, Cy) of the elliptical shape given by the "Center" attribute 31, and the shape and size of the periphery of the elliptical shape are determined from (specified by) the X-radius and the Y-radius of the elliptical shape given by the "RadiusX" attribute 33 and the "RadiusY" attribute 34, as shown in FIG. 3. From the above information, the positions of the points on the periphery of the elliptical shape in the printing area are determined.

Meanwhile, the position of the center of the gradation in the printing area is determined (specified) by the gradation center coordinates (Gx, Gy) given by the "GradientOrigin" attribute 32.

The gradation pattern in the elliptical shape is determined by interpolation by use of the red/green/blue color values (Rs, Gs, Bs) at the center (starting point) of the gradation specified by the GradientStop element 35a and the red/green/blue color values (Re, Ge, Be) at the points on the periphery of the elliptical shape (i.e. at the endpoints of the gradation) specified by the GradientStop element 35b, depending on the distance between the center of the gradation and each point on the periphery of the elliptical shape.

Next, the Path element 40 will be explained below. The Path element 40 specifies a drawing area in which each figure corresponding to each element (e.g. RadialGradientBrush element 30) included in a Path.Fill element 41 is drawn. In other words, each figure corresponding to each element included in the Path.Fill element 41 is drawn inside the drawing area specified by the Path element 40.

As shown in FIG. 2, the Path element 40 includes a "Data" attribute, which gives information on the drawing area in terms of the orthogonal coordinate system represented by the aforementioned X-axis and Y-axis.

Specifically, the "Data" attribute includes commands ("M Mx, My", "L Lx, Ly", "Z", etc.), and the drawing area is defined by line segments specified by the commands. For example, the command "M Mx, My" is used for moving a point called "endpoint" to coordinates (Mx, My), by which the starting point of the drawing area is determined.

The command "L Lx, Ly" is used for moving the endpoint to coordinates (Lx, Ly) so as to draw a line segment connecting the endpoints before and after the movement, by which an apex of the drawing area is determined.

The command "Z" is used for moving the endpoint to the starting point (Mx, My) of the drawing area so as to draw a line segment connecting the endpoints before and after the movement and close the area (drawing area) surrounded by the line segments, by which the shape of the whole drawing area is determined.

In the example of the Path element 40 shown in FIG. 2, the coordinates of the starting point of the drawing area are specified as (100, 140) by the command "M Mx, My" of the "Data" attribute, and the coordinates of two apexes of the drawing area are specified as (140, 160) and (120, 80) by the two commands "L Lx, Ly" of the "Data" attribute, by which the point represented by the coordinates (100, 140) is connected to the point represented by the coordinates (140, 160) and to the point represented by the coordinates (120, 80) by two line segments.

Further, by the command "Z" of the "Data" attribute, the point represented by the coordinates (120, 80) is connected to the point represented by the coordinates (100, 140) by a line segment. Thus, in this example, a triangular area having three apexes at (100, 140), (140, 160) and (120, 80) is specified as the drawing area (in which each figure corresponding to each element included in the Path.Fill element 41 is drawn).

Since a RadialGradientBrush element 30 is included in the Path.Fill element 41 in this example, the drawing area specified by the Path element 40 is determined as the gradation drawing area in which the elliptical radial gradation specified by the RadialradientBrush element 30 should be drawn as shown in FIG. 3.

As above, the gradation drawing area for which the elliptical radial gradation (drawn according to the RadialGradientBrush element 30 included in the Path.Fill element 41) should be drawn is specified by the Path element 40. Parameters (e.g. vector information) representing the gradation drawing area specified by the Path element 40 are stored in the drawing area memory 13c.

In the following, the principles for the drawing of the elliptical radial gradation employed in this embodiment will be explained referring to FIGS. 4A-4E. FIGS. 4A-4E are schematic diagrams for explaining the principles for the drawing of the elliptical radial gradation. In the following explanation, the 3×3 matrix shown below will be expressed as (a, b, c, d, e, f).

$$(a, b, c, d, e, f) = \begin{pmatrix} a, & b, & 0 \\ c, & d, & 0 \\ e, & f, & 1 \end{pmatrix}$$

In this embodiment, when the data received from the PC 100 together with a print command is an XPS document and the XPS document includes a RadialGradientBrush element 30, the printer control unit 10 (CPU 11) first extracts the parameters shown in FIG. 4A, that is, the elliptical shape parameters specifying an elliptical shape (i.e. the center coordinates (Cx, Cy), the X-radius Rx and the Y-radius Ry of the elliptical shape) and the gradation pattern parameters specifying a gradation pattern to be drawn in the elliptical shape (i.e. the center coordinates (Gx, Gy) of the gradation, the color values (Rs, Gs, Bs) at the center (starting point) of the gradation and the color values (Re, Ge, Be) at the periphery of the elliptical shape (endpoints of the gradation)), from the RadialGradientBrush element 30.

In this case, the CPU 11 further extracts the parameters specifying the gradation drawing area (for which the elliptical radial gradation specified by the RadialGradientBrush element 30 should be drawn) from the upper level element (e.g. Path element 40) of the RadialGradientBrush element 30 (S1 in FIG. 4A).

Incidentally, FIG. 4A is a schematic diagram (almost identical with FIG. 3) showing an example of the elliptical radial gradation drawn according to the parameters specified by the RadialGradientBrush element 30 and an example of the gradation drawing area specified by the Path element 40.

Subsequently, the CPU 11 generates a transformation matrix A for affine transforming the elliptical shape shown in FIG. 4A into the perfect circular shape shown in FIG. 4B (whose radius is Rx and whose center coordinates are (0, 0)) by use of the extracted elliptical shape parameters, according to the following equation (1) (S2 in FIG. 4B):

$$A=(1,0,0,Rx/Ry,-Cx,-(Rx/Ry) \cdot Cy) \quad (1)$$

Incidentally, while a case where the elliptical shape shown in FIG. 4A is affine transformed into the perfect circular shape shown in FIG. 4B (having a radius Rx and center coordinates (0, 0)) is explained in this embodiment, the elliptical shape shown in FIG. 4A may also be affine transformed into a perfect circular shape having a radius Ry and center coordinates (0, 0), or into a perfect circular shape having a radius R (arbitrary value) and center coordinates (0, 0).

In the former case, the transformation matrix A is generated according to the following equation (2). In the latter case, the transformation matrix A is generated according to the following equation (3).

$$A=(Ry/Rx,0,0,1,-(Ry/Rx)-Cx,-Cy) \quad (2)$$

$$A=(R/Rx,0,0,R/Ry,-(R/Rx) \cdot Cx,-(R/Ry) \cdot Cy) \quad (3)$$

Subsequently, the CPU 11 affine transforms the gradation center coordinates (Gx, Gy) shown in FIG. 4A using the transformation matrix A generated by the equation (1) (S3 in FIG. 4B). Then, the CPU 11 judges whether the center of the gradation after the affine transformation (see FIG. 4B) is on the nonnegative part of the Y-axis or not. If the gradation center after the affine transformation is not on the nonnegative part of the Y-axis, the CPU 11 calculates an angle θ between the positive Y-axis and a line segment connecting the origin (0, 0) and the gradation center (see FIG. 4B) (S4 in FIG. 4B).

Subsequently, the CPU 11 generates a transformation matrix B1 for rotation around the origin by the angle θ (affine transformation) according to the following equation (4), and then generates a transformation matrix B (i.e. the transformation matrix A to which a rotational element has been added) by multiplying the transformation matrix A by the transformation matrix B1 as shown in the following equation (5) (S5 in FIG. 4C).

$$B1=(\cos \theta, \sin \theta, -\sin \theta, \cos \theta, 0, 0) \quad (4)$$

$$B=A \cdot B1 \quad (5)$$

On the other hand, if the gradation center after the affine transformation using the transformation matrix A generated by the equation (1) is on the nonnegative part of the Y-axis, the transformation matrix A of the equation (1) is directly used as the transformation matrix B.

Subsequently, the CPU 11 sets the minimum rectangle R containing the whole of the gradation drawing area (S6 in FIG. 4A). The minimum rectangle R is set in this step for the following reason: While a certain area in which the gradation should be drawn has to be affine transformed in a subsequent step, directly affine transforming the gradation drawing area (specified by the Path element 40, etc.) requires complicated calculations in cases where the gradation drawing area has a complex shape.

For this reason, the load related to the drawing of the gradation is reduced in this embodiment by simplifying the calculations for the affine transformation, by setting the minimum rectangle R containing the whole of the gradation drawing area and executing the affine transformation to the minimum rectangle R.

Incidentally, while the minimum rectangle R is set for the gradation drawing area (specified by the Path element 40, etc.) irrespective of the shape of the gradation drawing area in this embodiment for simplification of the process, it is also possible to previously judge the complexity of the shape of the gradation drawing area and set the minimum rectangle R only when the gradation drawing area is judged to have a complex shape. When the gradation drawing area is judged to have a simple shape, the affine transformation may be executed directly to the gradation drawing area.

The judgment on the complexity of the shape of the gradation drawing area may be made based on the number of apexes of the gradation drawing area. For example, the gradation drawing area may be judged to have a complex shape when the number of apexes is a prescribed number (e.g. 5) or more. The shape of the gradation drawing area may be judged to be complex also when the periphery of the gradation drawing area includes a curved part.

Subsequently, the CPU 11 affine transforms the gradation center coordinates (Gx, Gy) shown in FIG. 4A using the aforementioned transformation matrix B (S7 in FIG. 4A), by which the elliptical shape shown in FIG. 4A is transformed into a perfect circular shape having a radius Rx and center coordinates (0, 0) and the gradation center is placed on the nonnegative part of the Y-axis as shown in FIG. 4C.

The CPU 11 also affine transforms the minimum rectangle R using the transformation matrix B (S7 in FIG. 4A), by which an area corresponding to the minimum rectangle R can be determined in the perfect circular shape (obtained by the affine transformation of the elliptical shape) as shown in FIG. 4C.

Subsequently, the CPU 11 sets the minimum rectangle R2 as the minimum rectangular area containing the whole of the area corresponding to the minimum rectangle R in the perfect circular shape (i.e. the whole of the minimum rectangle R after the affine transformation by the transformation matrix B) and having a side parallel to the scan lines (S8 in FIG. 4C).

Subsequently, the CPU 11 executes a rasterization process for drawing a perfect circular radial gradation shown in FIG. 4C for the minimum rectangle R2 (S9 in FIG. 4C). Specifically, the CPU 11 generates (art of) the radial gradation shown in FIG. 4D (in which the red/green/blue color values gradually change from the values (Rs, Gs, Bs) at the starting point of the gradation (i.e. the gradation center after the affine transformation placed on the nonnegative part of the Y-axis) to the values (Re, Ge, Be) at the endpoints of the gradation (i.e. the periphery of the perfect circular shape)) in the minimum rectangle R2.

The generated perfect circular radial gradation (in the minimum rectangle R2) is stored in the RAM 13 in the bitmap format, by which the rasterization process is completed. The details of the method of generating the perfect circular radial gradation will be explained later with reference to FIG. 5.

Since the minimum rectangle R2 has been set as a rectangular area having a side parallel to the scan lines, the range of the minimum rectangle R2 on each scan line can be equalized for all scan lines intersecting the minimum rectangle R2 in this rasterization process, by which the calculation of a starting position and an ending position for the drawing on each scan line can be made easier and the load related to the drawing of the gradation can be reduced further.

Further, when the perfect circular radial gradation is drawn for the minimum rectangle R2 in this embodiment, perfect circles necessary for the drawing of the minimum rectangle R2 (among all perfect circles (each of which should be drawn with a uniform color value) formed in the perfect circular radial gradation) are determined, and the perfect circular radial gradation is drawn for the minimum rectangle R2 based on the determined perfect circles.

For example, in the example shown in FIG. 4D, the second through fourth perfect circles from the periphery of the perfect circular shape (perfect circles other than the outermost perfect circle (periphery) or the innermost perfect circle) are specified (determined) as the perfect circles necessary for the drawing of the minimum rectangle R2, and the drawing of the perfect circular radial gradation for the minimum rectangle R2 is executed based on the second through fourth perfect circles from the periphery of the perfect circular shape.

With this method, among the perfect circles (each of which corresponds to a color value) drawn in the perfect circular radial gradation, the drawing process is executed only for the perfect circles necessary for the drawing of the minimum rectangle R2 (without specifying unnecessary perfect circles or executing the drawing process for the unnecessary perfect circles), by which the load related to the drawing of the gradation can be reduced further.

Subsequently, the CPU 11 executes the inverse affine transformation to the minimum rectangle R2 (in which the perfect circular radial gradation shown in FIG. 4D has been drawn) stored in the RAM 13 (S10 in FIG. 4D). The inverse affine transformation is executed using a transformation matrix as the inverse of the transformation matrix B (used for the affine transformation of the elliptical shape shown in FIG. 4A into the perfect circular shape shown in FIG. 4C).

The area obtained by the inverse affine transformation of the minimum rectangle R2 contains the whole of the gradation drawing area specified by the Path element 40, etc. since the minimum rectangle R2 is a rectangular area containing the whole of the minimum rectangle R (originally containing the whole gradation drawing area) after the affine transformation.

Therefore, by cutting out the gradation drawing area from the inversely affine transformed minimum rectangle R2, the gradation drawing area, in which (part of) the elliptical radial gradation specified by the RadialGradientBrush element 30 has been generated, can be obtained as shown in FIG. 4E.

The elliptical radial gradation generated as above is stored in the page memory 13f in the bitmap format, by which the rasterization of the gradation drawing area (in which the elliptical radial gradation has been generated) is completed.

Figure 5:
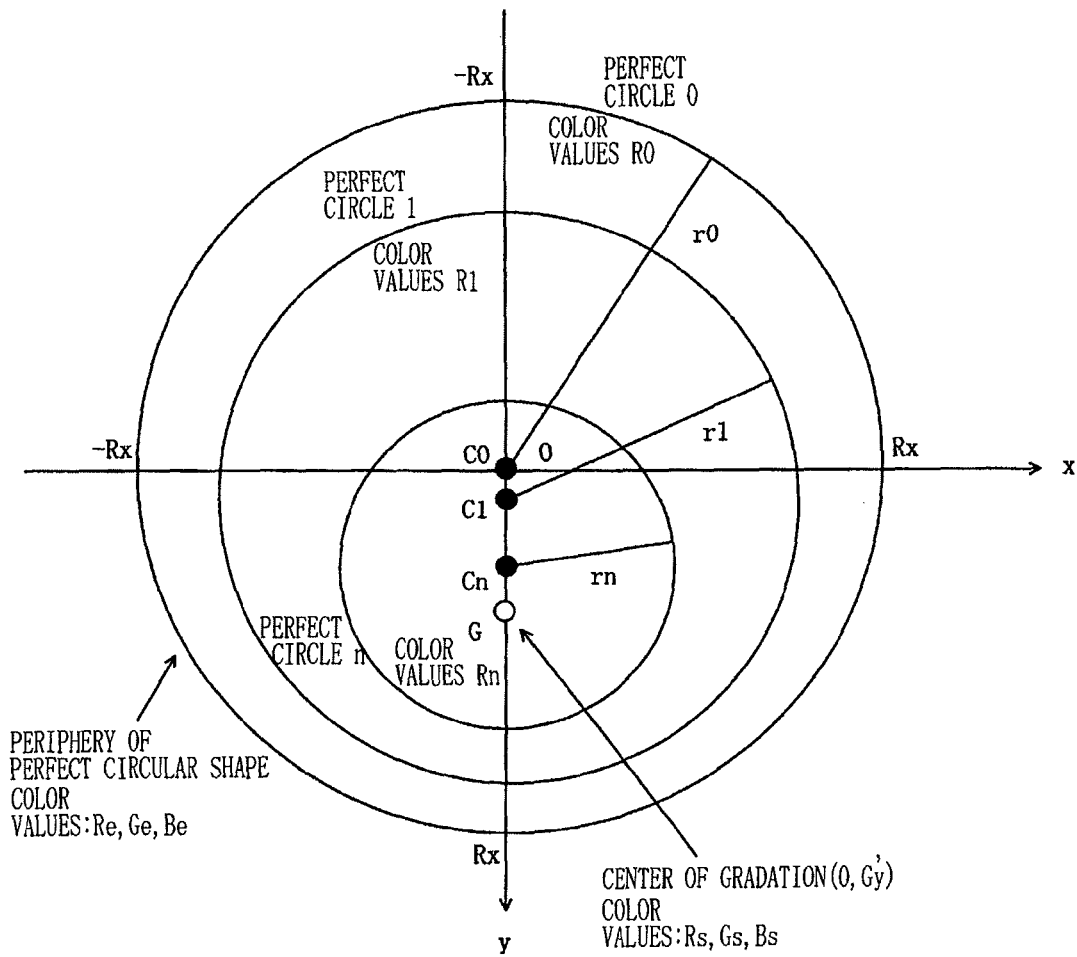
FIG. 5 is a schematic diagram for explaining a method of generating a red radial gradation for a perfect circular radial gradation.

Next, the method of generating the perfect circular radial gradation will be explained referring to FIG. 5. FIG. 5 is a schematic diagram for explaining a method of generating a red radial gradation for the perfect circular radial gradation.

For generating the perfect circular radial gradation, radial gradations of red, green and blue are generated independently. The methods of generating the green radial gradation and the blue radial gradation are identical with the method of generating the red radial gradation (explained here), and thus illustration and explanation thereof are omitted for brevity.

The perfect circular radial gradation (of red, green or blue) is generated in the minimum rectangle R2 (for which the gradation should be drawn) by calculating the center coordinates and the radius of each perfect circle (having a uniform color value) and drawing the inside of each perfect circle (specified by the center coordinates and the radius) with the uniform color value successively from the outermost one of the perfect circles necessary for the drawing of the minimum rectangle R2

The center coordinates and the radius of each perfect circle and the color value for the drawing of each perfect circle are calculated as follows: First, the center coordinates C0 and the radius r0 of the periphery of the perfect circular shape (perfect circle 0) are set at (0, 0) and Rx, respectively. Subsequently, a (red) color value R0 for the drawing of the points on the perfect circle 0 (specified by the center coordinates C0 and the radius r0) and the inside of the perfect circle 0 is set at the color value Re at the periphery of the perfect circular shape (endpoints of the gradation). The points on the perfect circle 0 and the inside of the perfect circle 0 are drawn with the color value R0.

Subsequently, center coordinates C1 (C1x, C1y), a radius r1 and a color value R1 of an inner perfect circle 1 (which is immediately inside the perfect circle 0 and for which the color value R1 different from the color value R0 of the perfect circle 0 is used) are calculated using the following equations (6)-(9):

$$C1x=0 \qquad (6)$$

$$C1y=G'y \cdot k/(Re-Rs) \qquad (7)$$

$$r1=r0-r0 \cdot k/(Re-Rs) \qquad (8)$$

$$R1=Re-k \qquad (9)$$

where "Gy" denotes the Y coordinate of the center of the radial gradation after the affine transformation by the transformation matrix B, and "k" denotes the variation (difference) in the color value between two adjacent perfect circles (two adjacent annular areas).

In this embodiment, the color value variation k is set at a negative value (e.g. −1) when the color value Rs at the center of the radial gradation is larger than the color value Re at the periphery of the perfect circular shape, or at a positive value (e.g. +1) when the color value Rs at the center of the radial gradation is smaller than the color value Re at the periphery of the perfect circular shape. Incidentally, the absolute value of the color value variation k may be set properly so that the color variation in the gradation looks smooth, in consideration of the human sense, characteristics of the color space, color reproduction performance of the printer 1, etc.

The inside of the perfect circle 1 (specified by the center coordinates C1 (C1x, C1y) and the radius r1 calculated by the equations (6)-(8)) is drawn with the color value R1 calculated by the equation (9).

Further, the center coordinates, the radius and the color value of each perfect circle necessary for the drawing of the minimum rectangle R2 (among the perfect circles 2, 3, ..., n, ...) are calculated successively from outside, while drawing the inside of each perfect circle (specified by the calculated center coordinates and radius) with the calculated color value. The process is repeated until the calculation of the center coordinates, radius and color value and the drawing (with the calculated color value) are completed for all perfect circles necessary for the drawing of the minimum rectangle R2. Incidentally, the center coordinates Cn (Cnx, Cny), the radius rn and the color value Rn of each perfect circle n (n can also be 0 or 1) are calculated by use of the following equations (10)-(13):

$$Cnx = 0 \qquad (10)$$

$$Cny = G'y \cdot n \cdot k/(Re-Rs) \qquad (11)$$

$$rn = r0 - r0 \cdot n \cdot k/(Re-Rs) \qquad (12)$$

$$Rn = Re - n \cdot k \qquad (13)$$

The perfect circular radial gradation (radial gradation in the perfect circular shape) is generated by the method described above. In this method, the center of the radial gradation has been placed on the nonnegative part of the Y-axis by the affine transformation using the transformation matrix B, and thus the X coordinate can be fixed at "0" in the calculation of the center coordinates of each perfect circle having a uniform color value.

In other words, the center coordinates of each perfect circle to be drawn with a uniform color value can be calculated as a one-dimensional function (using the Y coordinate only), by which the number of calculations necessary for the drawing of the radial gradation in the perfect circular shape can be reduced considerably.

Further, by the placement of the center of the radial gradation on the nonnegative part of the Y-axis by the affine transformation by the transformation matrix B, the center of the radial gradation after the affine transformation can be fixed at the center of the perfect circular shape or at a position on the positive side of the center of the perfect circular shape.

Next, the method of determining the perfect circles necessary for the drawing of the minimum rectangle R2 will be explained referring to FIGS. 6 and 7. First, a method for determining the outermost one of the perfect circles necessary for the drawing of the minimum rectangle R2 will be explained referring to FIG. 6.

For the determination of the outermost necessary perfect circle, judgment on whether each perfect circle (to be drawn with a uniform color value) contains the whole of the minimum rectangle R2 by satisfying a condition shown in FIG. 6 or not is made successively from the center of the perfect circular radial gradation toward the periphery of the perfect circular shape. The first perfect circle that is judged to contain the whole of the minimum rectangle R2 is determined as the outermost perfect circle necessary for the drawing of the minimum rectangle R2.

The judgment on whether each perfect circle n contains the whole minimum rectangle RN or not is made as explained below. Incidentally, the following explanation will be given assuming that the coordinates of the lower right corner of the minimum rectangle R2 (i.e. a point where the X coordinate and the Y coordinate are both maximum in the minimum rectangle R2) are (URx, URy), the coordinates of the upper left corner of the minimum rectangle R2 (i.e. a point where the X coordinate and the Y coordinate are both minimum in the minimum rectangle R2) are (LLx, LLy), the coordinates of the center Cn of the perfect circle n are (0, Cny), and the radius of the perfect circle n is m.

First, the absolute values of URx (X coordinate of the lower right corner of the minimum rectangle R2) and LLx (X coordinate of the upper left corner of the minimum rectangle R2) are compared with each other and the larger of the two is squared and substituted for a variable len_x. In other words, the variable len_x is set at $(LLx)^2$ if the absolute value of LLx (X coordinate of the upper left corner) is larger than the absolute value of URx (X coordinate of the lower right corner), otherwise the variable len_x is set at $(URx)^2$.

Subsequently, whether the two points (upper left corner, lower right corner) of the minimum rectangle R2 are contained in the perfect circle n or not is judged based on the following inequalities (14) and (15):

$$(LLy - Cny)^2 + len\_x < (m)^2 \qquad (14)$$

$$(URy - Cny)^2 + len\_x < (m)^2 \qquad (15)$$

If both of the inequalities (14) and (15) are satisfied, the two points (upper left corner, lower right corner) of the minimum rectangle R2 can be judged to be contained in the perfect circle n.

If the two points (upper left corner, lower right corner) are contained in the perfect circle n, the perfect circle n can be judged to contain the whole minimum rectangle R2. Thus, in this embodiment, the perfect circle n is judged to contain the whole minimum rectangle R2 when both the inequalities (14) and (15) are satisfied.

Next, a method for judging whether the drawing process has been executed for all perfect circles necessary for the drawing of the minimum rectangle R2 (when the drawing process is executed successively from the outermost necessary perfect circle determined by the method of FIG. 6) or not will be explained referring to FIG. 7.

This judgment is made when the drawing process is executed successively for each perfect circle from the outermost necessary perfect circle, by judging whether or not the perfect circle contains at least part of the minimum rectangle R2. At the point when a perfect circle is judged to contain no part of the minimum rectangle R2, the drawing process is judged to have been executed for all perfect circles necessary for the drawing of the minimum rectangle R2.

The judgment on whether each perfect circle n contains at least part of the minimum rectangle R2 or not is made by judging whether or not any of conditions (1)-(4) shown in FIG. 7 is satisfied.

The first condition (1) is that the uppermost part of the perfect circle n (i.e. a point where the Y coordinate is the minimum in the perfect circle n) is situated below the lowermost part of the minimum rectangle R2 (i.e. a point where the Y coordinate is the maximum in the minimum rectangle R2). The judgment on whether the condition (1) is satisfied or not is made using the following inequality (16):

$$(Cny - rn) > URy \qquad (16)$$

When the inequality (16) is satisfied, the uppermost part of the perfect circle n is judged to be situated below the lowermost part of the minimum rectangle R2, that is, the first condition (1) is satisfied.

The second condition (2) is that the lowermost part of the perfect circle n (i.e. a point where the Y coordinate is the maximum in the perfect circle n) is situated above the uppermost part of the minimum rectangle R2 (i.e. a point where the Y coordinate is the minimum in the minimum rectangle R2). The judgment on whether the condition (2) is satisfied or not is made using the following inequality (17):

$$(Cny+rn)<LLy \qquad (17)$$

When the inequality (17) is satisfied, the lowermost part of the perfect circle n is judged to be situated above the uppermost part of the minimum rectangle R2, that is, the second condition (2) is satisfied.

The third condition (3) is that the leftmost part of the perfect circle n (i.e. a point where the X coordinate is the minimum in the perfect circle n) is situated to the right of the rightmost part of the minimum rectangle R2 (i.e. a point where the X coordinate is the maximum in the minimum rectangle R2). The judgment on whether the condition (3) is satisfied or not is made using the following inequality (18):

$$-rn>URx \qquad (18)$$

When the inequality (18) is satisfied, the leftmost part of the perfect circle n is judged to be situated to the right of the rightmost part of the minimum rectangle R2, that is, the third condition (3) is satisfied.

The fourth condition (4) is that the rightmost part of the perfect circle n (i.e. a point where the X coordinate is the maximum in the perfect circle n) is situated to the left of the leftmost part of the minimum rectangle R2 (i.e. a point where the X coordinate is the minimum in the minimum rectangle R2). The judgment on whether the condition (4) is satisfied or not is made using the following inequality (19):

$$rn<LLx \qquad (19)$$

When the inequality (19) is satisfied, the rightmost part of the perfect circle n is judged to be situated to the left of the leftmost part of the minimum rectangle R2, that is, the fourth condition (4) is satisfied.

When any of the inequalities (16)-(19) is satisfied, the perfect circle n can be judged to contain no part of the minimum rectangle R2. On the other hand, when none of the inequalities (16)-(19) is satisfied, the perfect circle n is judged to contain at least part of the minimum rectangle R2.

Therefore, when the drawing process is executed successively for each perfect circle n from the outermost perfect circle (necessary for the drawing of the minimum rectangle R2) in this embodiment, the judgment on whether the perfect circle n satisfies any of the inequalities (16)-(19) or not is made, and the perfect circle n is judged to contain no part of the minimum rectangle R2 when any of the inequalities (16)-(19) is satisfied. At the point when a perfect circle n is judged to contain no part of the minimum rectangle R2, the drawing process is judged to have been executed for all perfect circles necessary for the drawing of the minimum rectangle R2.

Figure 8:
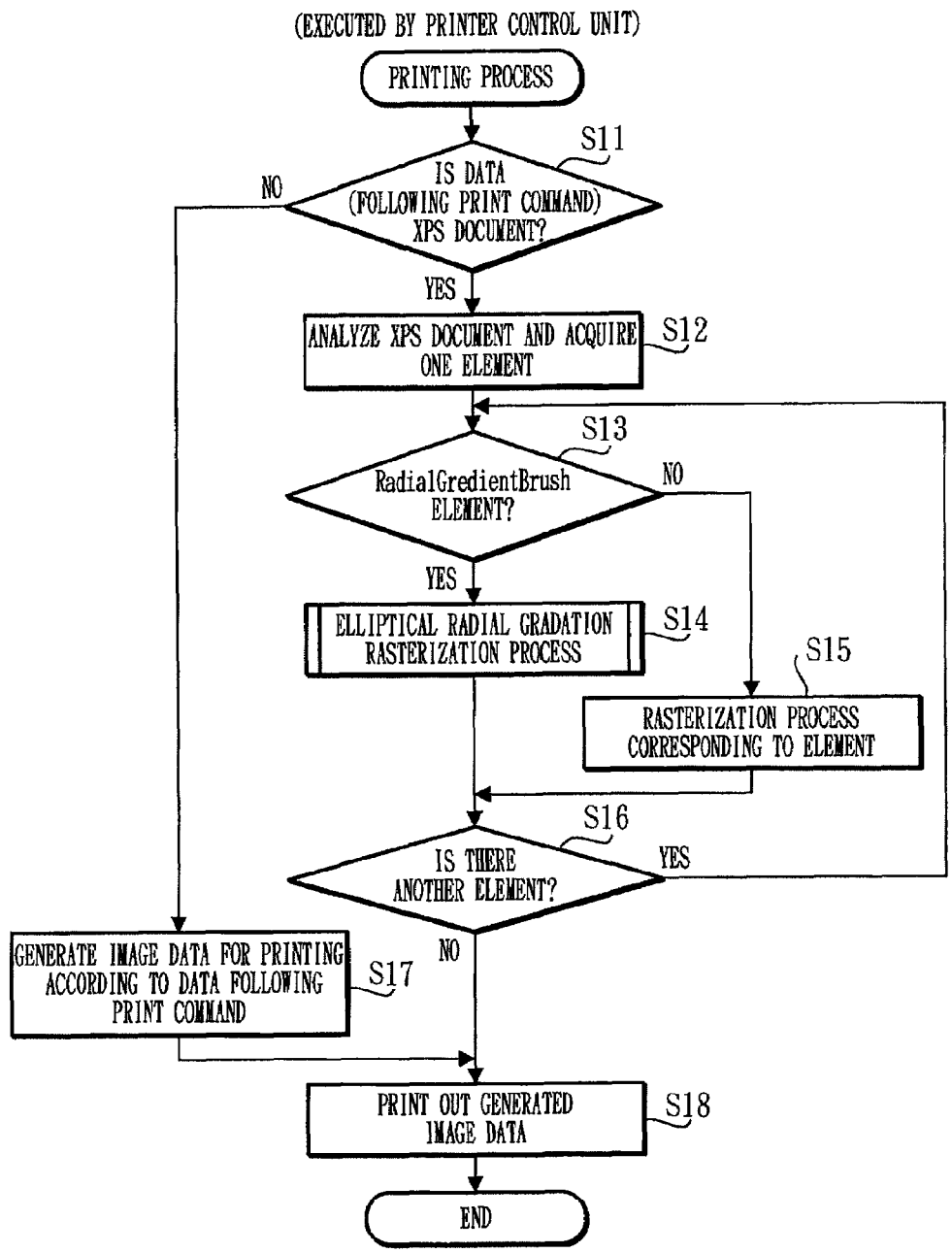
FIG. 8 is a flow chart of a printing process which is executed by the printer control unit.

In the following, the process flow of the printing process executed by the printer control unit 10 (CPU 11) will be described referring to FIG. 8. FIG. 8 is a flow chart of the printing process. The printing process, for generating the image data to be printed by the printer 1 based on the data received (following the print command) from the PC 100 via the interface 21 and printing out the generated image data, is started when the interrupt signal (sent from the interface 21 for informing the CPU 11 of the reception of the print command) is detected by the CPU 11.

At the start of the printing process, the CPU 11 (printer control unit 10) judges whether the data received from the PC 100 following the print command is an XPS document (document described according to XPS) or not (S11). When the data is an XPS document (S11:YES), the CPU 11 reads out the XPS document (which has been transferred from the interface 21 to the XPS data memory 13a by means of DMA (Direct Memory Access)) from the XPS data memory 13a, analyzes the contents of the XPS document, and acquires one element (corresponding to a drawing instruction) included in the XPS document (S12).

Subsequently, the CPU 11 judges whether the element acquired in S12 is a RadialGradientBrush element 30 or not (S13). When the acquired element is a RadialGradientBrush element 30 (S13:YES), the CPU 11 (judging that the acquired element is an instruction for drawing an elliptical radial gradation) executes the elliptical radial gradation rasterization process (FIG. 9) which will be explained later (S14).

By the elliptical radial gradation rasterization process, the elliptical radial gradation specified by the RadialGradientBrush element 30 can be generated for the gradation drawing area specified by the upper level element such as the Path element 40 (see FIG. 2) while reducing the load related to the drawing of the gradation. The generated elliptical radial gradation is rasterized on the page memory 13f. After the step S14, the process advances to step S16.

On the other hand, when the element (corresponding to a drawing instruction) acquired in S12 is not a RadialGradientBrush element 30 (S13: NO), the CPU 11 executes a rasterization process corresponding to the acquired element, stores image data generated by the rasterization process in the page memory 13f (S15), and thereafter advances to the step S16.

In the step S16, the CPU 11 judges whether the XPS document still includes an element (corresponding to a drawing instruction) that has not been extracted (acquired) in S12 yet. When the XPS document includes an element (corresponding to a drawing instruction) yet to be extracted (S16: YES), the CPU 11 returns to the step S12 to repeat the steps S12-S16 for the next element.

The steps S12-S16 are repeated until all the elements (corresponding to drawing instructions) included in the XPS document are extracted in S12 and the rasterization process (S14 or S15) is completed for all such elements (S16: NO), by which the image data specified by the XPS document is rasterized on the page memory 13f.

In this case where all the elements (corresponding to drawing instructions) included in the XPS document have been extracted in S12 and the rasterization process (S14 or SIS) has been completed for all such elements (S16: NO), the process advances to step S18.

Meanwhile, when the data received from the PC 100 following the print command is not an XPS document in S11 (S11: NO), the CPU 11 generates image data (for printing) according to the contents of the data received following the print command and then stores the generated image data in the page memory 13f (S17). Thereafter, the process advances to the step S18.

In the step S18, the CPU 11 sends signals to the feeding motor driving circuit 17 and the head driver 20 based on the image data generated in S11-S17 and stored in the page memory 13f, by which the feeding motor 16 and the inkjet head 19 are driven and an image according to the image data is printed on a sheet (completion of the printing process of FIG. 8).

By the printing process (FIG. 8) explained above, upon reception of a print command from the PC 100, image data can be generated based on the data following the print command, and an image according to the generated image data can be printed on a sheet.

In the printing process, when an XPS document is received from the PC 100 as the data following the print command, the XPS document is analyzed. When a RadialGradientBrush element 30 is included in the XPS document, the elliptical radial gradation rasterization process (explained below) is executed, by which the printer control unit 10 (CPU 11) is allowed to generate the elliptical radial gradation specified by the RadialGradientBrush element 30 for the gradation drawing area specified by the upper level element (e.g. Path element 40) of the RadialGradientBrush element 30 while reducing the load related to the drawing of the gradation.

Next, the elliptical radial gradation rasterization process, which is executed by the printer control unit 10 (CPU 11) as the step S14 in FIG. 8, will be explained referring to FIGS. 9-13. FIG. 9 is a flow chart of the elliptical radial gradation rasterization process.

The elliptical radial gradation rasterization process is executed for generating an elliptical radial gradation (specified by a RadialGradientBrush element 30 included in an XPS document) for the gradation drawing area specified by the upper level element (e.g. Path element 40) of the RadialGradientBrush element 30.

The elliptical radial gradation rasterization process is executed by the printer control unit 10 (CPU 11) in the printing process (FIG. 8) when the data following the print command is an XPS document and a RadialGradientBrush element 30 is included in an element described in the XPS document. The elliptical radial gradation rasterization process (FIG. 9) will be explained below while associating it with the aforementioned principles for the drawing of the elliptical radial gradation shown in FIGS. 4A-4E.

At the start of the elliptical radial gradation rasterization process, the CPU 11 (printer control unit 10) executes the parameter acquisition process (S21), by which the elliptical shape parameters (specifying an elliptical shape) and the gradation pattern parameters (specifying a gradation pattern to be drawn in the elliptical shape) are extracted from the RadialGradientBrush element 30 and the parameters specifying the gradation drawing area (in which the radial gradation should be drawn) are extracted from the upper level element (e.g. Path element 40) of the RadialradientBrush element 30. The details of the parameter acquisition process will be explained later with reference to FIG. 10. This parameter acquisition process (S21) corresponds to the step S1 shown in FIG. 4A.

Subsequently, the CPU 11 executes the transformation matrix calculation process (S22), by which the transformation matrix B, for affine transforming the elliptical shape specified by the RadialGradientBrush element 30 (see FIG. 4A) into the perfect circular shape having the radius Rx and center coordinates (0, 0) while placing the gradation center on the nonnegative part of the Y-axis (see FIG. 4C), is generated. The details of the transformation matrix calculation process will be explained later with reference to FIG. 11. This transformation matrix calculation process (S22) corresponds to the steps S2-S5 shown in FIG. 4B.

Subsequently, the CPU 11 executes the drawing minimum rectangle setting process (S23), by which the minimum rectangle R containing the whole of the gradation drawing area (whose parameters have been extracted from the upper level element (e.g. Path element 40)) is set, the minimum rectangle R is affine transformed using the transformation matrix B calculated by the transformation matrix calculation process, and the minimum rectangle R2 (containing the whole of the area obtained by the affine transformation of the minimum rectangle R and having a side parallel to the scan lines) is set as the area for the drawing of the perfect circular radial gradation (radial gradation in the perfect circular shape obtained by the affine transformation of the elliptical shape by the transformation matrix B). The details of the drawing minimum rectangle setting process will be explained later with reference to FIG. 12. This drawing minimum rectangle setting process (S23) corresponds to the steps S6-S8 shown in FIGS. 4A-4C.

Thereafter, the CPU 11 executes the gradation generating process (S24) and ends the elliptical radial gradation rasterization process of FIG. 9. In the gradation generating process (S24), the perfect circular radial gradation is drawn for the minimum rectangle R2 which has been set by the drawing minimum rectangle setting process and the minimum rectangle R2 in which the radial gradation has been drawn is inversely affine transformed using the inverse matrix of the transformation matrix B. By cutting out the gradation drawing area from the inversely affine transformed minimum rectangle R2, the gradation drawing area, in which (part of) the elliptical radial gradation specified by the RadialGradientBrush element 30 has been generated, can be obtained. The details of the gradation generating process will be explained later with reference to FIG. 13. This gradation generating process (S24) corresponds to the steps S9 and S10 shown in FIGS. 4C and 4D.

Figure 10:
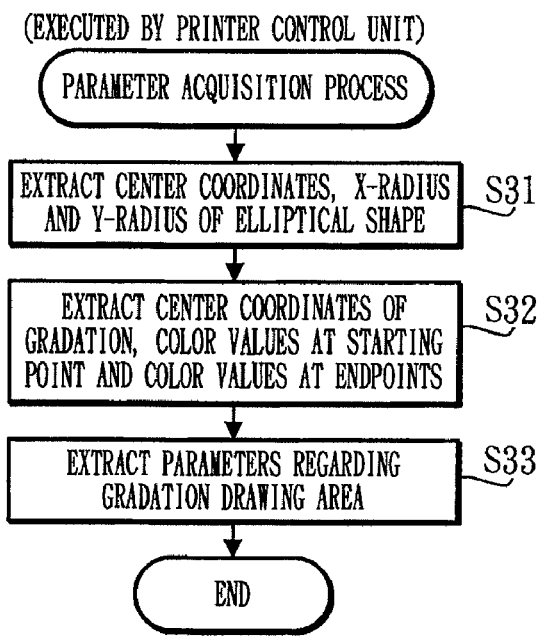
FIG. 10 is a flow chart of a parameter acquisition process which is executed by the printer control unit.

Next, the parameter acquisition process executed by the printer control unit 10 (CPU 11) will be explained referring to FIG. 10. FIG. 10 is a flow chart of the parameter acquisition process. This process, for extracting the parameters regarding the drawing of the elliptical radial gradation from the RadialGradientBrush element 30 and its upper level element (e.g. Path element 40), is executed by the CPU 11 in the elliptical radial gradation rasterization process as mentioned above.

First, the CPU 11 extracts the center coordinates (Cx, Cy), the X-radius Rx and the Y-radius Ry of the elliptical shape (see FIGS. 2 and 3) from the RadialGradientBrush element 30 as the elliptical shape parameters (specifying an elliptical shape) and stores the extracted parameters in the gradation parameter memory 13$b$ (S31).

Subsequently, the CPU 11 extracts the center coordinates (Gx, Gy) of the gradation, the red/greer/blue color values (Rs, Gs, Bs) at the center (starting point) of the gradation and the red/greenlblue color values (Re, Ge, Be) at the periphery of the elliptical shape (endpoints of the gradation) (see FIGS. 2 and 3) from the RadialGradientBrush element 30 as the gradation pattern parameters (specifying a gradation pattern to be drawn in the elliptical shape) and stores the extracted parameters also in the gradation parameter memory 13$b$ (S32).

Subsequently, the CPU 11 extracts the parameters specifying the gradation drawing area (for which the elliptical radial gradation should be drawn) from the upper level element (e.g. Path element 40) of the RadialGradientBrush element 30, stores parameters (e.g. vector information on the gradation drawing area) determined from the extracted parameters in the drawing area memory 13$c$ (S33), and ends the parameter acquisition process of FIG. 10.

By the above parameter acquisition process, the parameters regarding the drawing of the elliptical radial gradation are extracted from the RadialGradientBrush element 30 and its upper level element (e.g. Path element 40), and the elliptical shape parameters (specifying the elliptical shape) and the gradation pattern parameters (specifying the gradation pattern to be drawn in the elliptical shape) are stored in the gradation parameter memory 13b while storing the parameters specifying the gradation drawing area (for which the elliptical radial gradation should be drawn) in the drawing area memory 13c.

Figure 11:
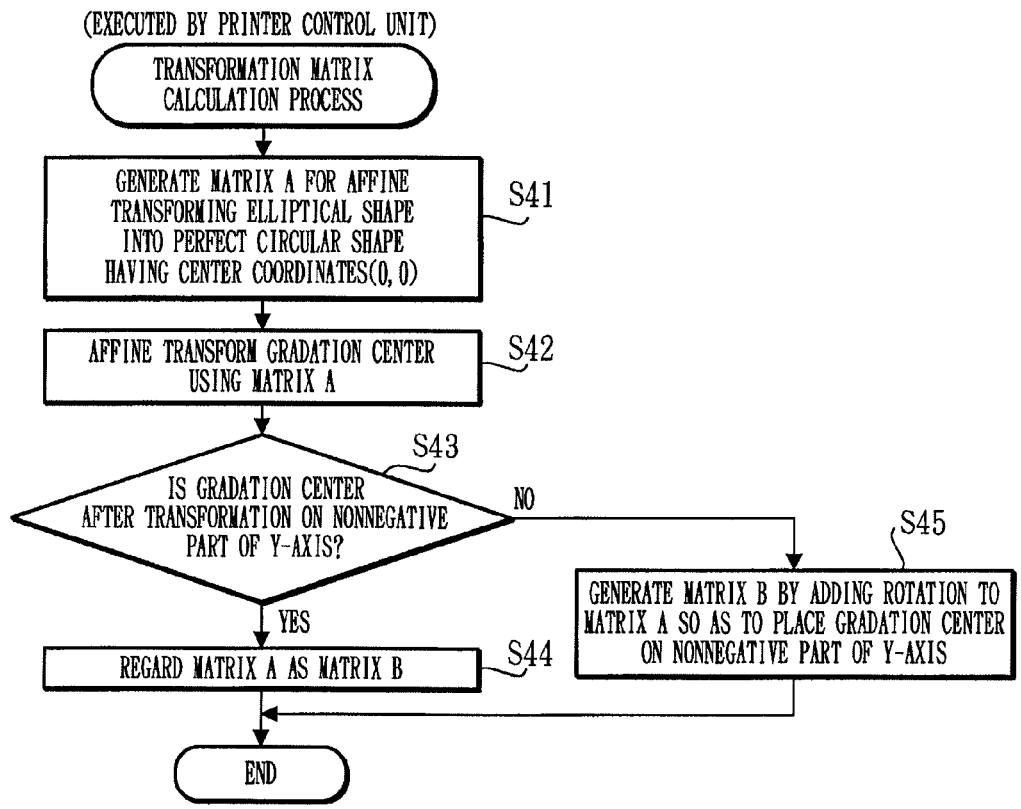
FIG. 11 is a flow chart of a transformation matrix calculation process which is executed by the printer control unit.

Next, the transformation matrix calculation process executed by the printer control unit 10 (CPU 11) will be explained referring to FIG. 11. FIG. 11 is a flow chart of the transformation matrix calculation process. This process, for calculating the transformation matrix B for affine transforming the elliptical shape specified by the RadialGradientBrush element 30 (see FIG. 4A) into a perfect circular shape having the radius Rx and center coordinates (0, 0) while placing the gradation center on the nonnegative part of the Y-axis (see FIG. 4C), is executed by the CPU 11 in the elliptical radial gradation rasterization process as mentioned above.

First, the CPU 11 reads out the elliptical shape parameters stored in the gradation parameter memory 13b, generates the transformation matrix A for the affine transformation from the elliptical shape specified by the RadialGradientBrush element 30 (see FIG. 4A) into a perfect circular shape having the radius Rx and center coordinates (0, 0) (see FIG. 4B) using the aforementioned equation (1), and stores the generated transformation matrix A in the transformation matrix memory 13d (S41).

Incidentally, the step S41 may be configured to generate a different transformation matrix A by use of the equation (2) and store the generated transformation matrix A in the transformation matrix memory 13d so as to affine transform the elliptical shape into a perfect circular shape having a radius Ry and center coordinates (0, 0), as mentioned above.

The step S41 may also be configured to generate a different transformation matrix A by use of the equation (3) and store the generated transformation matrix A in the transformation matrix memory 13d so as to affine transform the elliptical shape into a perfect circular shape having a radius R (arbitrary value) and center coordinates (0, 0), as mentioned above.

This step S41 corresponds to the step S2 shown in FIG. 4B.

After generating the transformation matrix A and storing it in the transformation matrix memory 13d (S41), the CPU 11 affine transforms the gradation center coordinates (Gx, Gy) stored in the gradation parameter memory 13b using the transformation matrix A stored in the transformation matrix memory 13d (S42). This step S42 corresponds to the step S3 shown in FIG. 4B.

Subsequently, the CPU 11 judges whether the gradation center coordinates obtained by the affine transformation of S42 are on the nonnegative part of the Y-axis or not (S43). When the gradation center coordinates after the affine transformation are on the nonnegative part of the Y-axis (S43: YES), the CPU 11 keeps the transformation matrix A stored in the transformation matrix memory 13d (in order to use the transformation matrix A directly as the transformation matrix B) (S44) and ends the transformation matrix calculation process of FIG. 11.

On the other hand, when the gradation center coordinates after the affine transformation are not on the nonnegative part of the Y-axis (S43: NO), the CPU 11 calculates the angle θ between the positive Y-axis and the line segment connecting the origin (0, 0) and the gradation center after the affine transformation (see FIG. 4B) (step S4 shown in FIG. 4B), generates the transformation matrix B by adding the rotational operation around the origin (0, 0) by the angle θ (i.e. the aforementioned rotational element) to the transformation matrix A stored in the transformation matrix memory 13d by use of the equations (4) and (5) (step S5 shown in FIG. 4B), stores the generated transformation matrix B in the transformation matrix memory 13d by overwriting the transformation matrix A (S45), and ends the transformation matrix calculation process of FIG. 11.

By the above transformation matrix calculation process, the transformation matrix B (for affine transforming the elliptical shape specified by the RadialGradientBrush element 30 (see FIG. 4A) into the perfect circular shape having the radius Rx and center coordinates (0, 0) while placing the gradation center on the nonnegative part of the Y-axis (see FIG. 4C)) can be generated.

Next, the drawing minimum rectangle setting process executed by the printer control unit 10 (CPU 11) will be explained referring to FIG. 12. FIG. 12 is a flow chart of the drawing minimum rectangle setting process. This process, for setting the minimum rectangle R2 (see FIG. 4C) as the area for the drawing of the perfect circular radial gradation (radial gradation in the perfect circular shape obtained by the affine transformation of the elliptical shape using the transformation matrix B), is executed by the CPU 11 in the elliptical radial gradation rasterization process as mentioned above.

First, the CPU 11 sets the minimum rectangle R containing the whole of the gradation drawing area based on the parameters specifying the gradation drawing area stored in the drawing area memory 13c (S51). Subsequently, the CPU 11 affine transforms the minimum rectangle R using the transformation matrix B finally stored in the transformation matrix memory 13d (S52). These steps S51 and S52 correspond to the steps S6 and S7 shown in FIG. 4A, respectively.

By the step S52, an area corresponding to the minimum rectangle R (containing the whole of the gradation drawing area for which the elliptical radial gradation should be drawn) can be determined in the perfect circular shape obtained by the affine transformation of the elliptical shape using the transformation matrix B.

The affine transformation in S52 can be executed to a rectangular area (minimum rectangle R) since the minimum rectangle R as the minimum rectangular area containing the whole of the gradation drawing area has been set in S51 and the affine transformation is executed to the minimum rectangle R in S52.

In other words, the affine transformation in S52 can be conducted just by affine transforming the coordinates of the four apexes of the minimum rectangle R. Therefore, the number of calculations necessary for the affine transformation can be kept small even when the gradation drawing area has a complex shape, by which the load related to the drawing of the gradation can be reduced.

After finishing S52, the CPU 11 sets the minimum rectangle R2 (containing the whole of the area obtained by the affine transformation of the minimum rectangle R and having a side parallel to the scan lines) as the area for the drawing of the perfect circular radial gradation (radial gradation in the perfect circular shape obtained by the affine transformation of the elliptical shape using the transformation matrix B) (S53) and ends the drawing minimum rectangle setting process of FIG. 12. The coordinates of the minimum rectangle R2 set in this step S53 are stored in the minimum rectangle memory 13e. This step S53 corresponds to the step S8 shown in FIG. 4C.

By the step S53, the minimum rectangle R2, containing an area corresponding to the gradation drawing area, can be determined (set) in the perfect circular shape obtained by the affine transformation. Therefore, an image in which the elliptical radial gradation has been drawn for the gradation drawing area can be generated by drawing the perfect circular radial gradation for the minimum rectangle R2 and then inversely affine transforming the minimum rectangle R2 (in which the perfect circular radial gradation has been drawn) using the inverse matrix of the transformation matrix B in the gradation generating process (FIG. 13) which will be explained below.

Further, since the minimum rectangle R2 has been set as a rectangular area having a side parallel to the scan lines, the range of the minimum rectangle R2 on each scan line can be equalized for all scan lines intersecting the minimum rectangle R2 in this rasterization process, by which the calculation of the starting position and the ending position for the drawing on each scan line can be made easier and the load related to the drawing of the gradation can be reduced further.

Furthermore, the area (size) of the minimum rectangle R2 can be made as small as possible since the minimum rectangle R2 is set as the minimum rectangular area containing the whole of the area (in the perfect circular shape) corresponding to the minimum rectangle R and having a side parallel to the scan lines. Since the minimum rectangle R is also set as the minimum rectangular area containing the whole of the radial gradation to be drawn, the area (size) of the minimum rectangle R2 can be reduced to a minimum while letting the minimum rectangle R2 contain the whole of an area corresponding to the radial gradation area (radial gradation to be drawn). Thanks to the minimization of the area in which the perfect circular radial gradation is drawn, the load related to the drawing of the gradation is reduced considerably.

Next, the gradation generating process executed by the printer control unit 10 (CPU 1) will be explained referring to FIG. 13. FIG. 13 is a flow chart of the gradation generating process. This process, for generating an image in which the elliptical radial gradation specified by the RadialGradientBrush element 30 has been drawn for the gradation drawing area specified by the upper level element (e.g. Path element 40), is executed by the CPU 11 in the elliptical radial gradation rasterization process as mentioned above.

First, the CPU 11 affine transforms the gradation center coordinates (Gx, Gy) stored in the gradation parameter memory 13b using the transformation matrix B stored in the transformation matrix memory 13d (S61), by which the gradation center is placed on the nonnegative part of the Y-axis as shown in FIG. 4C. This step S61 corresponds to the step S7 shown in FIG. 4A.

In subsequent steps S62-S64, the CPU 11 determines the outermost one of the perfect circles (each of which is drawn with a uniform color value in the perfect circular radial gradation) necessary for the drawing of the minimum rectangle R2. In the step S62, the CPU 11 calculates the number (M) of perfect circles each of which is drawn with a uniform color value in the perfect circular radial gradation, and sets a variable n at M−1.

The variable n is used for selecting (specifying) one of the perfect circles (0, 1, ..., n, ..., (M−1)) shown in FIG. 4C (each of which is drawn with a uniform color value) in the perfect circular radial gradation. The subsequent steps will be executed for each perfect circle n specified by the variable n. Thus, the innermost perfect circle (M−1) in the perfect circular radial gradation is selected by the step S62, and the subsequent steps are executed for the innermost perfect circle (M−1) first.

Incidentally, the number (M) of perfect circles can be calculated by dividing the color value difference between the starting point and the endpoints of the gradation by the aforementioned color value variation k. Each time the variable n is set at a new value (n), the value (n) is stored in a storage area (for the variable n) temporarily reserved in the RAM 13.

Subsequently, the CPU 11 calculates the center coordinates Cn (Cnx, Cny) and the radius rn of the perfect circle n using the equations (10)-(12) (S63). In this embodiment, the X coordinate Cnx of the center Cn of the perfect circle n is 0 as shown in the equation (10) since the center of the perfect circular shape (obtained by the affine transformation using the transformation matrix B) is at the origin and the gradation center is placed on the nonnegative part of the Y-axis.

Subsequently, the CPU 11 reads out the coordinates (URx, URy) of the lower right corner of the minimum rectangle R2 (i.e. the point where the X coordinate and the Y coordinate are both maximum in the minimum rectangle R2) and the coordinates (LLx, LLy) of the upper left corner of the minimum rectangle R2 (i.e. the point where the X coordinate and the Y coordinate are both minimum in the minimum rectangle R2) from the minimum rectangle memory 13e storing the coordinates of the minimum rectangle R2 and then judges whether the perfect circle n contains the whole of the minimum rectangle R2 or not based on the coordinates (URx, URy) and (LLx, LLy) of the two corners and the center coordinates Cn (0, Cny) and radius rn of the perfect circle n (S64). This judgment is made by judging whether the conditions shown in FIG. 6 are satisfied or not.

When the perfect circle n is judged not to contain the whole minimum rectangle R2 (S64: NO), the CPU 11 decrements the variable n by 1 (S65) and returns to the step S63, by which the next (immediately outer) perfect circle is selected and the steps S63 and S64 are executed for the next perfect circle, that is, the center coordinates and radius of the immediately outer perfect circle are calculated using the equations (10)-(12) and the judgment on whether the immediately outer perfect circle contains the whole minimum rectangle R2 or not is made based on the calculated center coordinates and radius.

The steps S63-S65 are repeated until the currently processed perfect circle n is judged to contain the whole minimum rectangle R2 in S64 (S64: YES), by which the judgment on whether each perfect circle (to be drawn with a uniform color value) contains the whole of the minimum rectangle R2 or not is made successively from the innermost perfect circle toward the periphery of the perfect circular shape.

When the currently processed perfect circle n is judged to contain the whole minimum rectangle R2 in S64 (S64: YES), the perfect circle n can be determined as the outermost perfect circle n necessary for the drawing of the minimum rectangle R2.

In subsequent steps S66-S78, the CPU 11 draws the perfect circular radial gradation that should be generated for the minimum rectangle R2, by successively overwriting the inside of each perfect circle n with a corresponding color value from the outermost perfect circle n necessary for the drawing of the minimum rectangle R2. These steps S66-S78 correspond to the step S9 shown in FIG. 4C.

Incidentally, the drawing in each perfect circle is executed in units of drawing lines (scan lines in the X-axis direction). The radial gradation obtained by the drawing is stored in the RAM 13 (rasterization).

In the step S66, the CPU 11 judges whether the Y coordinate (Cny+rn) of the lowermost part of the perfect circle n (i.e. the point where the Y coordinate is the maximum in the perfect circle n) is larger than the Y coordinate URy of the lowermost part of the minimum rectangle R2 (i.e. the point where the Y coordinate is the maximum in the minimum rectangle R2). If affirmative (S66: YES), the CPU 11 sets a Y coordinate Ly of the drawing line (hereinafter referred to as a "drawing line coordinate") at the Y coordinate URy of the lowermost part of the minimum rectangle R2 (S67) and advances to step S69. By the step S67, a drawing line specified by the Y coordinate URy of the lowermost part of the minimum rectangle R2 is determined as the first drawing line to be drawn with the color value of the perfect circle n calculated from the equation (13).

On the other hand, when the Y coordinate (Cny+m) of the lowermost part of the perfect circle n is judged not to be larger than the Y coordinate URy of the lowermost part of the minimum rectangle R2 in S66 (S66: NO), the CPU 11 sets the drawing line coordinate Ly at the Y coordinate (Cny+m) of the lowermost part of the perfect circle n (S68) and advances to the step S69. By the step S68, a drawing line specified by the Y coordinate (Cny+m) of the lowermost part of the perfect circle n is determined as the first drawing line to be drawn with the color value of the perfect circle n calculated from the equation (13). Each time the drawing line coordinate Ly is set at a new value (Ly), the value (Ly) is stored in a storage area (for the drawing line coordinate Ly) temporarily reserved in the RAM 13.

In the step S69, the CPU 11 calculates X coordinates of two points on the perfect circle n at the drawing line coordinate Ly based on the drawing line coordinate Ly and the center coordinates Cn (0, Cny) and radius m of the perfect circle n, and specifies the obtained two X coordinates as drawing end coordinates Lx (S69). Each time the values (Lx) of the drawing end coordinates Lx are set, the values (Lx) are stored in a storage area (for the drawing end coordinates Lx) temporarily reserved in the RAM 13.

Subsequently, the CPU 11 judges whether the two drawing end coordinates Lx are within the X coordinate range of the minimum rectangle R2 or not by comparing each drawing end coordinate Lx with the X coordinates URx and LLx of the right and left ends of the minimum rectangle R2 (S70).

When at least one of the drawing end coordinates Lx is judged not to be within the X coordinate range of the minimum rectangle R2 (S70: NO), the CPU 11 replaces the value of the drawing end coordinate Lx (not within the X coordinate range of the minimum rectangle R2) with the value of the X coordinate URx or LLx (of the right or left end of the minimum rectangle R2) closer to the drawing end coordinate Lx (S71) and thereafter advances to step S72.

On the other hand, when both of the two drawing end coordinates Lx are judged to be within the X coordinate range of the minimum rectangle R2 (S70: YES), the CPU 11 advances to the step S72 while skipping S71. In this case, the drawing end coordinates Lx which have been set in S69 are kept without change.

A range (on the drawing line) sandwiched between the two drawing end coordinates Lx can be determined as the part (on the drawing line at the drawing line coordinate Ly) that should be drawn with the color value of the perfect circle n calculated from the equation (13). In the step S72, the CPU 11 draws the range (on the drawing line) sandwiched between the two drawing end coordinates Lx with the color value of the perfect circle n calculated from the equation (13). Thus, on the drawing line specified by the drawing line coordinate Ly, a prescribed part in the minimum rectangle R2 can be drawn with the color value corresponding to the perfect circle n.

After finishing S72, the CPU 11 decrements the drawing line coordinate Ly by 1 (S73), by which the drawing line is switched to the next (immediately upper) line. Subsequently, the CPU 11 judges whether or not the drawing line coordinate Ly updated in S73 is within the Y coordinate range of the minimum rectangle R2 and within the Y coordinate range of the perfect circle n (S74).

The judgment of S74 is made by judging whether or not the drawing line coordinate Ly is between the Y coordinate URy of the lowermost part of the minimum rectangle R2 (i.e. the point where the Y coordinate is the maximum in the minimum rectangle R2) and the Y coordinate LLy of the uppermost part of the minimum rectangle R2 (i.e. the point where the Y coordinate is the minimum in the minimum rectangle R2) and between the Y coordinate (Cny+m) of the lowermost part of the perfect circle n (i.e. the point where the Y coordinate is the maximum in the perfect circle n) and the Y coordinate (Cny−m) of the uppermost part of the perfect circle n (i.e. the point where the Y coordinate is the minimum in the perfect circle n).

When the drawing line coordinate Ly is judged to be within the Y coordinate range of the minimum rectangle R2 and within the Y coordinate range of the perfect circle n (S74: YES), the CPU 11 returns to the step S69 and executes the steps S69-S74 again for the updated drawing line (drawing line coordinate Ly).

The steps S69-S74 are repeated as long as the drawing line coordinate Ly is judged in S74 to be within the Y coordinate range of the minimum rectangle R2 and within the Y coordinate range of the perfect circle n (S74: YES), by which a part inside the perfect circle n, existing in the minimum rectangle R2, can be drawn with a color value calculated from the equation (13).

On the other hand, when the drawing line coordinate Ly is judged to be not within the Y coordinate range of the minimum rectangle R2 or not within the Y coordinate range of the perfect circle n in S74 (S74: NO), the CPU 11 judges whether the variable n is less than M−1 (the number M of perfect circles (each of which is drawn with a uniform color value) minus 1) or not (S75).

When the variable n is M−1, that is, when the variable n is not less than M−1 (S75: NO), the CPU 11 (judging that there exists no other perfect circle (to be drawn with a uniform color value) inside the perfect circle n) advances to step S79.

On the other hand, when the variable n is less than M−1 (S75: YES), the CPU 11 (judging that there exists at least one perfect circle (to be drawn with a uniform color value) inside the perfect circle n) increments the variable n by 1 (S76), by which an immediately inner perfect circle (inside the currently processed perfect circle n) is selected as the next processing target.

Subsequently, the CPU 11 calculates the center coordinates Cn and the radius rn of the (new) perfect circle n using the equations (10)-(12) (S77) and then judges whether the perfect circle n contains at least part of the minimum rectangle R2 (S78) in order to judge whether the drawing has been finished for all perfect circles necessary for the drawing of the minimum rectangle R2.

The judgment of S78 is made by reading out the coordinates (URx, URy) of the lower right corner of the minimum rectangle R2 and the coordinates (LLx, LLy) of the upper left corner of the minimum rectangle R2 from the minimum rectangle memory 13e storing the coordinates of the minimum rectangle R2 and judging whether at least one of the conditions (1)-(4) shown in FIG. 7 is satisfied or not based on the coordinates (URx, URy) and (LLx, LLy) and the center coordinates Cn (0, Cny) and radius m of the perfect circle n.

When the perfect circle n is judged to contain no part of the minimum rectangle R2 (S78: NO), the CPU 11 (judging that drawing has been finished for all perfect circles necessary for the drawing of the minimum rectangle R2) advances to the step S79.

On the other hand, when the perfect circle n is judged to contain at least part of the minimum rectangle R2 (S78: YES), the CPU 110 (judging that the drawing has not been finished for all perfect circles necessary for the drawing of the minimum rectangle R2) returns to the step S66, by which the steps S66-S74 are executed for the perfect circle n newly selected in S76 (immediately inner perfect circle), by which a part inside the newly selected perfect circle n, existing in the minimum rectangle R2, is drawn with a color value calculated from the equation (13).

The steps S66-S74 are repeated as long as the variable n is judged to be less than M−1 in S75 (S75: YES) and the perfect circle n is judged to contain at least part of the minimum rectangle R2 in S78 (S78: YES), by which the drawing explained above can be completed for the inside of every perfect circle necessary for the drawing of the minimum rectangle R2, by which the perfect circular radial gradation can be generated for the minimum rectangle R2.

In the step S79 (which is reached when the variable n is judged to be M−1 (i.e. not less than M−1) in S75 (S75: NO) or when the perfect circle n is judged to contain no part of the minimum rectangle R2 in S78 (S78: NO)), the CPU 11 calculates the inverse matrix C of the transformation matrix B stored in the transformation matrix memory 13d.

Subsequently, the CPU 11 inversely affine transforms the minimum rectangle R2 (in which the perfect circular radial gradation has been drawn) using the calculated inverse matrix C (S80), by which the elliptical radial gradation can be generated in the inversely affine transformed minimum rectangle R2 which contains the gradation drawing area (whose parameters have been stored in the drawing area memory 13c). This step S80 corresponds to the step S10 shown in FIG. 4D.

Finally, the CPU 11 extracts the gradation drawing area (whose parameters have been stored in the drawing area memory 13c) from the inversely affine transformed minimum rectangle R2, stores (image data of) the extracted gradation drawing area in the page memory 13h in the bitmap format (S81), and ends the gradation generating process of S13, by which the elliptical radial gradation rasterization process (FIG. 9) is completed.

By the elliptical radial gradation rasterization process explained above, the elliptical radial gradation specified by the RadialGradientBrush element 30 can be generated for the gradation drawing area specified by the upper level element (e.g. Path element 40).

In the gradation generating process (FIG. 13), perfect circles that are drawn with color values necessary for the drawing of the perfect circular radial gradation in the minimum rectangle R2 are determined by the steps S63-S65 and S77, and the drawing is executed only for the determined perfect circles. In other words, perfect circles unnecessary for the drawing in the minimum rectangle R2 are determined and drawing-related processing is prevented from being executed for the unnecessary perfect circles, by which the load related to the drawing of the is reduced.

In the elliptical radial gradation rasterization process (FIGS. 9-13) executed by the printer control unit 10 as explained above, the drawing of the perfect circular radial gradation is executed first (without directly drawing the elliptical radial gradation), by which the color changing points (around which different colors are drawn) can be calculated based on the locus of a perfect circle. Since the calculation can be simplified compared to the case where the elliptical radial gradation is drawn directly, the load related to the drawing of the gradation can be reduced considerably.

Further, since the drawing of the perfect circular radial gradation is executed for the minimum rectangle R2 containing the area corresponding to the gradation drawing area, the area in which the perfect circular radial gradation is drawn can be reduced (compared to cases where the whole of the perfect circular radial gradation is drawn) while achieving the drawing of the perfect circular radial gradation at least for the area corresponding to the gradation drawing area, by which the load related to the drawing of the gradation can be reduced further.

Meanwhile, the inverse matrix C of the transformation matrix B (generated based on the elliptical shape parameters for transforming the elliptical shape into the perfect circular shape) is calculated, and the minimum rectangle R2 in which the perfect circular radial gradation has been drawn is inversely affine transformed by use of the inverse matrix C, by which the radial gradation according to the elliptical shape and gradation pattern specified by the RadialGradientBrush element 30 can be generated for the gradation drawing area specified by the upper level element (e.g. Path element 40) with ease.

Therefore, in cases where there exists a RadialGradientBrush element in a document described according to XPS, an elliptical radial gradation specified by the RadialGradientBrush element can be generated while reducing the load related to the drawing of the gradation.

As described above, by the printer control unit 10 of the printer 1 in accordance with this embodiment, the elliptical shape (specified by the RadialGradientBrush element) is affine transformed into a perfect circular shape using a transformation matrix, an area containing the gradation drawing area (specified by the upper level element such as a Path element) is also affine transformed using the same transformation matrix, and a perfect circular radial gradation is drawn for an area containing the area obtained by the affine transformation of the area containing the gradation drawing area, by which the load related to the drawing of the radial gradation can be reduced. By inversely affine transforming the area in which the perfect circular radial gradation has been drawn, the gradation drawing area in which the elliptical radial gradation has been drawn can be obtained. Thus, the elliptical radial gradation can be generated while reducing the load related to the drawing of the radial gradation.

Further, with the printer 1 in accordance with this embodiment, when data received from the PC 100 following a print command includes an instruction for drawing an elliptical radial gradation, the elliptical radial gradation is generated based on the drawing instruction by the above printer control unit 10. Therefore, the printing of an elliptical radial gradation can be carried out by generating the elliptical radial gradation while reducing the load related to the drawing of the radial gradation.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the major axis and minor axis of the elliptical shape specified by the RadialGradientBrush element (image drawing instruction) of the XPS document are set in the X-axis direction and Y-axis direction in the above embodiment, the major axis and minor axis of the elliptical shape may be set in arbitrary directions.

In this case, it is possible to first execute rotational affine transformation to the elliptical shape specified by the image drawing instruction so as to set its major axis and minor axis in the X-axis direction and Y-axis direction, execute the same affine transformation to the gradation drawing area, generate an elliptical radial gradation for the affine transformed gradation drawing area according to the drawing principles explained referring to FIGS. 4A-4E, and finally execute inverse rotational affine transformation to the obtained elliptical radial gradation to return the major axis and minor axis of the (rotated) elliptical shape to the original directions specified by the image drawing instruction.

While the color values at the center (starting point) of the gradation and the color values at the periphery of the elliptical shape (endpoints of the gradation) are specified by the RadialGradientBrush.GradientStops element included in the RadialGradientBrush element in the above embodiment, the above embodiment is applicable also to cases where the RadialGradientBrush.GradientStops element further includes a GradientStop element which specifies color values at an arbitrary point between the starting point and endpoint of the gradation.

In this case, a value represented by an "Offset" attribute of the GradientStop element specifying the color values at the arbitrary point indicates a (relative) distance d between the starting point of the gradation and the arbitrary point for which the color values are specified by the GradientStop element (when the distance between the starting point and an endpoint of the gradation situated on a line extending from the starting point and crossing the arbitrary point is normalized to "1"). Therefore, the drawing of the gradation for (in) the perfect circular shape can be executed by setting color values of corresponding points (that are the (relative) distance d away from the center (starting point) of the perfect circular gradation) at the color values of the arbitrary point specified by the GradientStop element.

While the inverse matrix C of the transformation matrix B is calculated after generating the perfect circular radial gradation for the minimum rectangle R2 in the gradation generating process (FIG. 13) in the above embodiment, the timing of the inverse matrix calculation is not restricted to that in the above embodiment; the inverse matrix C may be calculated at any time after the generation of the transformation matrix B and before the inverse affine transformation of the minimum rectangle R2 in which the radial gradation has been drawn.

While the elliptical radial gradation rasterization process (FIG. 9) is executed when (on condition that) data received from the PC 100 following a print command is an XPS document and a RadialradientBrush element (as an instruction for drawing an elliptical radial gradation) is included in the XPS document in the above embodiment, the condition for executing the elliptical radial gradation rasterization process is not restricted to that in the embodiment. The elliptical radial gradation rasterization process may be executed at any time when an instruction for drawing an elliptical radial gradation is included in PDL data (data described in a PDL (Page Description Language)) received from the PC 100 following a print command.

While the printer control unit 10 is provided inside the printer 1 in the above embodiment, the printer control unit 10 may be provided outside the printer 1 and connected to the printer 1 via a communication cable or wireless communication. The printer control unit 10 may also be provided inside the PC 100.

While the elliptical radial gradation rasterization process (FIG. 9) is executed by the printer control unit 10 to generate an elliptical radial gradation to be printed by the printer 1 in the above embodiment, the elliptical radial gradation rasterization process may be executed not only by such a printer control unit but also by any unit/device that controls a device for outputting an elliptical radial gradation.

For example, in cases where a display is used for displaying an elliptical radial gradation, a display control unit for controlling the display may execute the elliptical radial gradation rasterization process (FIG. 9) and rasterize the elliptical radial gradation generated by the process on a frame memory for storing image data to be displayed on the display.

While the printer 1 in the above embodiment prints an image (e.g. elliptical radial gradation) on a sheet (e.g. paper) as a print medium, the printer 1 may also be configured to execute the printing on other types of print media (fabric, plastic, vinyl, etc.).

While the transformation matrix B is generated so as to place the center of the gradation after the affine transformation on the nonnegative part of the Y-axis in the above embodiment, the transformation matrix B may also be generated so as to place the gradation center (after the affine transformation) on the nonpositive part of the Y-axis. It is also possible to generate the transformation matrix B so as to place the gradation center (after the affine transformation) on the nonnegative part of the X-axis or on the nonpositive part of the X-axis.

While the minimum rectangle R as the minimum rectangular area containing the whole of the gradation drawing area is set for the gradation drawing area in the above embodiment, the area set for the gradation drawing area does not necessarily have to be the minimum rectangular area; it is also possible to just set a rectangular area containing the whole gradation drawing area, a triangular area containing the whole gradation drawing area, etc. Even in such cases, the calculation related to the affine transformation can be simplified and the load related to the drawing of the gradation can be reduced.

While the minimum rectangle R2 as the minimum rectangular area containing the whole of the affine transformed minimum rectangle R (the area obtained by the affine transformation of the minimum rectangle R) and having a side parallel to the scan lines is set for the affine transformed minimum rectangle R in the above embodiment, the area set for the affine transformed minimum rectangle R does not necessarily have to be the minimum rectangular area; it is also possible to just set a rectangular area smaller than the perfect circular shape, containing the whole of the affine transformed minimum rectangle R, and having a side parallel to the scan lines. Even in this case, the calculation of the starting position and the ending position for the drawing on each scan line can be made easier and the load related to the drawing of the gradation can be reduced.

While the inside of the elliptical shape of the gradation is drawn in the above embodiment, it is also possible to draw an area outside the elliptical shape according to the type (Pad, Reflect, Repeat) of a "SpreadMethod" attribute included in the RadialGradientBrush element.

What is claimed is:
1. An image generating device comprising:
   a target data accepting unit that accepts target data including an image drawing instruction for drawing an elliptical radial gradation;
   an acquisition unit that acquires the image drawing instruction from the accepted target data;
   an extraction unit that extracts elliptical shape parameters specifying an elliptical shape, gradation pattern parameters specifying a gradation pattern to be drawn in the elliptical shape, and drawing area parameters specifying a drawing area in which the elliptical radial gradation is drawn, from the acquired image drawing instruction;
   a transformation matrix generating unit that generates a transformation matrix for transforming the elliptical shape into a perfect circular shape based on the elliptical shape parameters;
   an inverse matrix calculating unit that calculates an inverse matrix of the transformation matrix;

a first transformation unit that transforms the gradation pattern parameters using the transformation matrix;

a second transformation unit that transforms a first area containing the drawing area specified by the drawing area parameters, using the transformation matrix;

a drawing unit that draws, in a second area, a radial gradation for the perfect circular shape obtained by the transformation with the transformation matrix, based on the transformed gradation pattern parameters transformed by the first transformation unit, wherein the second area contains the transformed first area transformed by the second transformation unit; and a gradation generating unit that generates the elliptical radial gradation in the drawing area by inversely transforming the second area, in which the radial gradation for the perfect circular shape has been drawn by the drawing unit, using the inverse matrix.

2. The image generating device according to claim 1, further comprising a first rectangular area setting unit that sets a first rectangular area, containing the whole of the drawing area, as the first area.

3. The image generating device according to claim 1, wherein:

the drawing unit is configured to draw the radial gradation in units of scan lines for image drawing, and the image generating device further comprises a second rectangular area setting unit that sets a second rectangular area as the second area, wherein the second rectangular area contains the whole of the transformed first area transformed by the second transformation unit and has a side parallel to the scan lines.

4. The image generating device according to claim 1, wherein:

the drawing of the radial gradation for the perfect circular shape is executed by determining a plurality of perfect circles, each of the plurality of perfect circles being to be drawn with a uniform color value in regard to each color value used for the drawing of the gradation, and the image generating device further comprises a perfect circle selection unit that selects one or more perfect circles among the plurality of perfect circles, the selected one or more perfect circles being necessary for drawing the radial gradation in the second area by the drawing unit, and the drawing unit draws the radial gradation in the perfect circular shape in the second area based on the perfect circles determined by the perfect circle determination unit.

5. The image generating device according to claim 1 wherein:

the target data accepting unit is configured to accept target data described according to XML Paper Specification, and the image generating device further comprises an instruction judgment unit that judges that the image drawing instruction includes an instruction for drawing an elliptical radial gradation if the image drawing instruction includes a RadialGradientBrush element, and the extraction unit extracts center coordinates, a major axis radius and a minor axis radius of the elliptical shape from the RadialGradientBrush element as the elliptical shape parameters, while extracting center coordinates of the gradation from the RadialGradientBrush element as the gradation pattern parameters.

6. A printing device comprising an image generating unit that generates an image and a printing unit that prints the image generated by the image generating unit on a print medium, wherein the image generating unit includes:

a target data accepting unit that accepts target data including an image drawing instruction for drawing an elliptical radial gradation;

an acquisition unit that acquires the image drawing instruction from the accepted target data;

an extraction unit that extracts elliptical shape parameters specifying an elliptical shape, gradation pattern parameters specifying a gradation pattern to be drawn in the elliptical shape, and drawing area parameters specifying a drawing area in which the elliptical radial gradation is drawn, from the acquired image drawing instruction;

a transformation matrix generating unit that generates a transformation matrix for transforming the elliptical shape into a perfect circular shape based on the elliptical shape parameters;

an inverse matrix calculating unit that calculates an inverse matrix of the transformation matrix;

a first transformation unit that transforms the gradation pattern parameters using the transformation matrix;

a second transformation unit that transforms a first area, containing the drawing area specified by the drawing area parameters, using the transformation matrix;

a drawing unit that draws, in a second area, a radial gradation for the perfect circular shape obtained by the transformation with the transformation matrix, based on the transformed gradation pattern parameters transformed by the first transformation unit, wherein the second area contains the transformed first area transformed by the second transformation unit; and a gradation generating unit that generates the elliptical radial gradation in the drawing area by inversely transforming the second area, in which the radial gradation for the perfect circular shape has been drawn by the drawing unit, using the inverse matrix.

7. The printing device according to claim 6, wherein the image generating unit further includes a first rectangular area setting unit that sets a first rectangular area containing the whole of the drawing area as the first area.

8. The printing device according to claim 6, wherein:

the drawing unit is configured to draw the radial gradation in units of scan lines for image drawing, and the image generating unit further includes a second rectangular area setting unit that sets a second rectangular area as the second area, wherein the second rectangular area contains the whole of the transformed first area transformed by the second transformation unit and has a side parallel to the scan lines.

9. The printing device according to claim 6, wherein:

the drawing of the radial gradation in the perfect circular shape is executed by determining a plurality of perfect circles, each of the plurality of the perfect circles being to be drawn with a uniform color and the colors of the plurality of the perfect circles being different from each other, and the image generating unit further includes a perfect circle selection unit that selects one or more perfect circles among the plurality of perfect circles, the selected one or more perfect circles being necessary for drawing the radial gradation in the second area, and the drawing unit draws the radial gradation for the perfect circular shape in the second area based on the selected one or more perfect circles.

10. The printing device according to claim 6, wherein:

the target data accepting unit is configured to accept target data described according to XML Paper Specification, and the image generating unit further includes an instruction judgment unit that judges that the image drawing instruction includes an instruction for drawing an elliptical radial gradation if the image drawing instruction includes a RadialGradientBrush element, and the extraction unit extracts center coordinates, a major axis radius and a minor axis radius of the elliptical shape from the RadialGradientBrush element, as the elliptical shape parameters while extracting center coordinates of the gradation from the RadialGradientBrush element as the gradation pattern parameters.

11. An image generating method comprising:

a target data accepting step of accepting target data including an image drawing instruction for drawing an elliptical radial gradation;

an acquisition step of acquiring the image drawing instruction from the accepted target data;

an extraction step of extracting elliptical shape parameters specifying an elliptical shape, gradation pattern parameters specifying a gradation pattern to be drawn in the elliptical shape, and drawing area parameters specifying a drawing area in which the elliptical radial gradation is drawn, from the acquired image drawing instruction;

a transformation matrix generating step of generating a transformation matrix for transforming the elliptical shape into a perfect circular shape based on the elliptical shape parameters;

an inverse matrix calculating step of calculating an inverse matrix of the transformation matrix;

a first transformation step of transforming the gradation pattern parameters using the transformation matrix;

a second transformation step of transforming a first area containing the drawing area specified by the drawing area parameters, using the transformation matrix;

a drawing step of drawing, in a second area, a radial gradation for the perfect circular shape obtained by the transformation with the transformation matrix, based on the transformed gradation pattern parameters transformed by the first transformation step, wherein the second area contains the transformed first area transformed the second transformation step;

a gradation generating step of generating the elliptical radial gradation in the drawing area by inversely transforming the second area, in which the radial gradation for the perfect circular shape has been drawn by the drawing step, using the inverse matrix; and an elliptical radial gradation rasterization step of rasterizing and printing the generated elliptical radial gradation.

12. The image generating method according to claim 11, further comprising a first rectangular area setting step of setting a first rectangular area, containing the whole of the drawing area.

13. The image generating method according to claim 11, wherein:

the drawing step is configured to draw the radial gradation in units of scan lines for image drawing, and the image generating method further comprises a second rectangular area setting step of setting a second rectangular area as the second area, wherein the second rectangular area contains the whole of the transformed first area transformed by the second transformation step and has a side parallel to the scan lines.

14. The image generating method according to claim 11, wherein:

the drawing of the radial gradation for the perfect circular shape is executed by determining a plurality of perfect circles, each of the plurality of the perfect circles being to be drawn with a uniform color and the colors of the plurality of the perfect circles being different from each other, and the image generating method further comprises a perfect circle selection step of selecting one or more perfect circles among the plurality of perfect circles, the selected one or more perfect circles being necessary for drawing the radial gradation in the second area, and the drawing step draws the radial gradation for the perfect circular shape in the second area based on the selected one or more perfect circles.

15. The image generating method according to claim 11, wherein:

the target data accepting step is configured to accept target data described according to XML Paper Specification, and the image generating method further comprises an instruction judgment step of judging that the image drawing instruction includes an instruction for drawing an elliptical radial gradation if the image drawing instruction includes a RadialGradientBrush element, and the extraction step extracts center coordinates, a major axis radius and a minor axis radius of the elliptical shape from the RadialGradientBrush element, as the elliptical shape parameters while extracting center coordinates of the gradation from the RadialGradientBrush element as the gradation pattern parameters.

* * * * *